(12) United States Patent
Oka

(10) Patent No.: US 9,384,559 B2
(45) Date of Patent: Jul. 5, 2016

(54) IMAGE PROCESSING APPARATUS, IMAGE PROCESSING METHOD, AND MEDIUM THAT DETERMINE WHETHER A CANDIDATE REGION OF A SPECIFIC REGION IN DIVIDED IMAGES FORMS THE SPECIFIC IMAGE, BASED ON SHAPE INFORMATION

(71) Applicant: CANON KABUSHIKI KAISHA, Tokyo (JP)

(72) Inventor: Hiroyuki Oka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/475,658

(22) Filed: Sep. 3, 2014

(65) Prior Publication Data

US 2015/0071543 A1 Mar. 12, 2015

(30) Foreign Application Priority Data

Sep. 12, 2013 (JP) .................................. 2013-189614

(51) Int. Cl.
*G06K 9/34* (2006.01)
*G06T 7/00* (2006.01)
*G06T 7/40* (2006.01)

(52) U.S. Cl.
CPC ............... *G06T 7/0083* (2013.01); *G06T 7/408* (2013.01); *G06T 2200/28* (2013.01); *G06T 2207/10024* (2013.01); *G06T 2207/30216* (2013.01)

(58) Field of Classification Search
None
See application file for complete search history.

(56) References Cited

U.S. PATENT DOCUMENTS

| 6,804,413 | B1 * | 10/2004 | Horie | G06T 11/60 382/284 |
|---|---|---|---|---|
| 8,451,506 | B2 | 5/2013 | Oka | |
| 2004/0240747 | A1 * | 12/2004 | Jarman | H04N 1/624 382/274 |
| 2006/0280362 | A1 * | 12/2006 | Umeda | G06K 9/0061 382/167 |

FOREIGN PATENT DOCUMENTS

| JP | 2000-076416 A | 3/2000 |
|---|---|---|
| JP | 3707523 B2 | 10/2005 |

\* cited by examiner

*Primary Examiner* — Feng Niu
(74) *Attorney, Agent, or Firm* — Fitzpatrick, Cella, Harper & Scinto

(57) ABSTRACT

An image processing apparatus includes an acquisition unit to acquire a plurality of divided images from one image. The divided images that neighbor one another do not have an overlapping region. An extraction unit extracts a candidate region of a specific region in the divided image. In a case when candidate regions extracted by the extraction unit neighbor one another at the boundary between the divided images that neighbor one another, a combining unit combines shape information of the candidate regions that neighbor one another. A determination unit determines whether the candidate regions form the specific region by using the shape information combined by the combining unit.

8 Claims, 25 Drawing Sheets

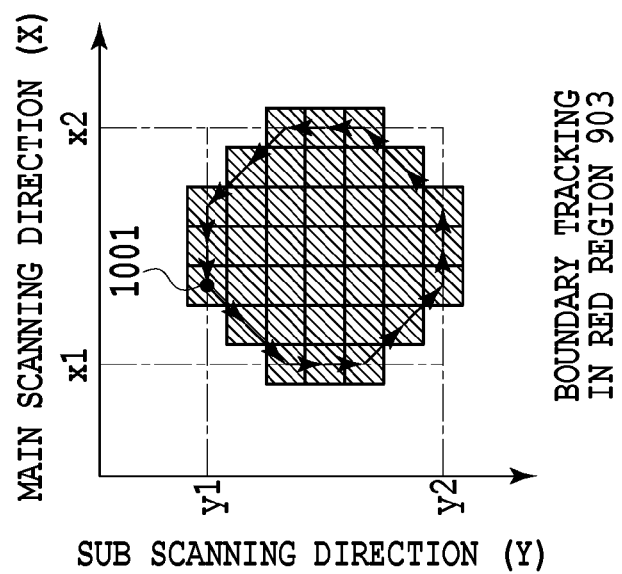
FIG.10A BOUNDARY TRACKING IN RED REGION 903
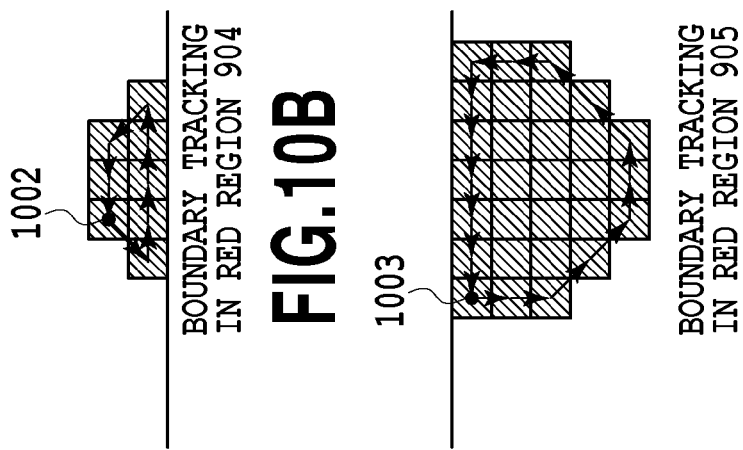
FIG.10B BOUNDARY TRACKING IN RED REGION 904
FIG.10C BOUNDARY TRACKING IN RED REGION 905
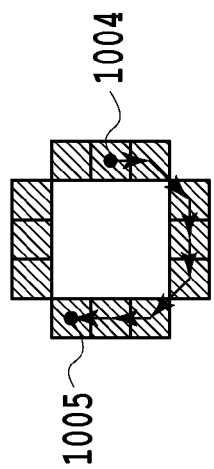
FIG.10D
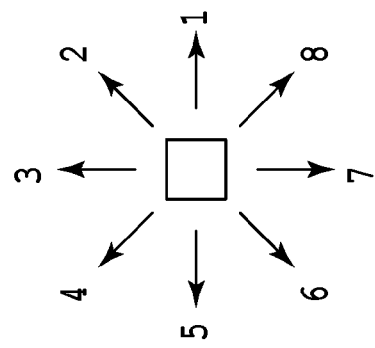
FIG.10E DIRECTION EDGE

DIRECTION HISTOGRAM OF RED REGION 903

| DIRECTION | 1 | 2 | 3 | 4 | 5 | 6 | 7 | 8 |
|---|---|---|---|---|---|---|---|---|
| FREQUENCY | 2 | 2 | 2 | 2 | 2 | 2 | 2 | 2 |
| EXCLUSION | 0 | 0 | 0 | 0 | 0 | 0 | 0 | 0 |

FIG.11A

DIRECTION HISTOGRAM OF RED REGION 904

| DIRECTION | 1 | 2 | 3 | 4 | 5 | 6 | 7 | 8 |
|---|---|---|---|---|---|---|---|---|
| FREQUENCY | 0 | 0 | 0 | 1 | 2 | 1 | 0 | 0 |
| EXCLUSION | 4 | 0 | 0 | 0 | 0 | 0 | 0 | 0 |

FIG.11B

DIRECTION HISTOGRAM OF RED REGION 905

| DIRECTION | 1 | 2 | 3 | 4 | 5 | 6 | 7 | 8 |
|---|---|---|---|---|---|---|---|---|
| FREQUENCY | 2 | 2 | 2 | 0 | 0 | 0 | 2 | 2 |
| EXCLUSION | 0 | 0 | 0 | 0 | 6 | 0 | 0 | 0 |

FIG.11C

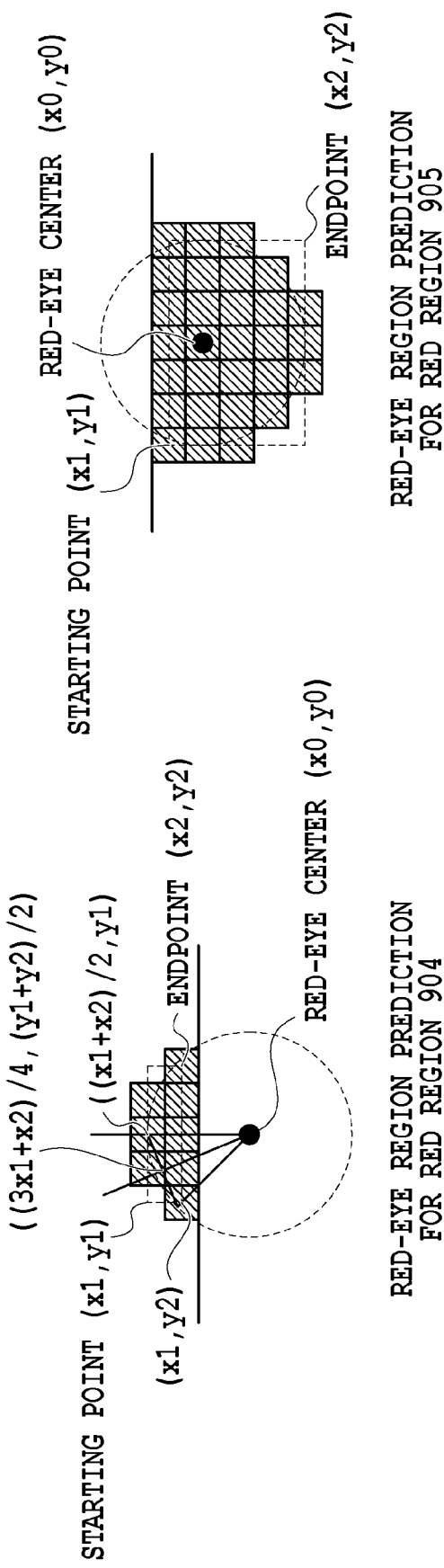

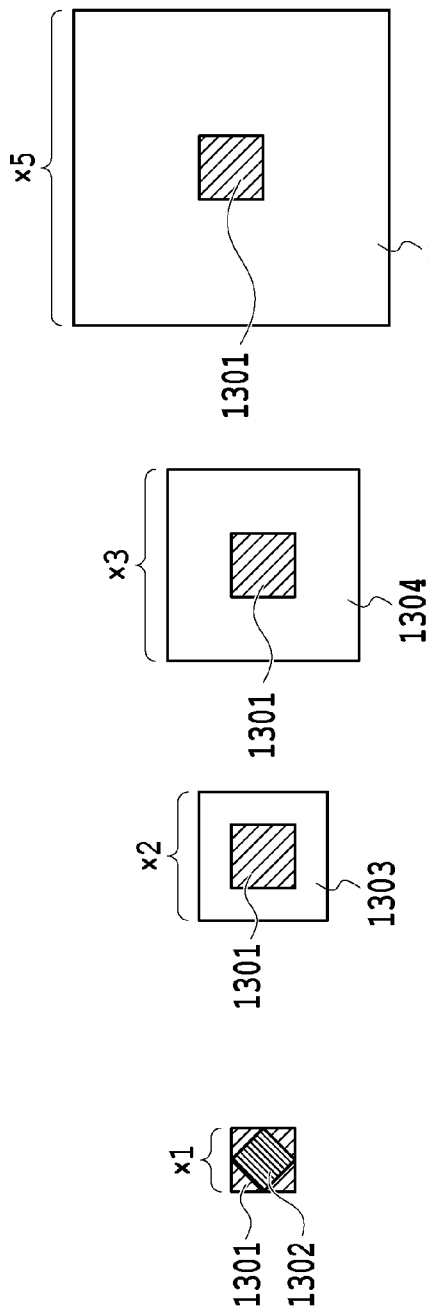
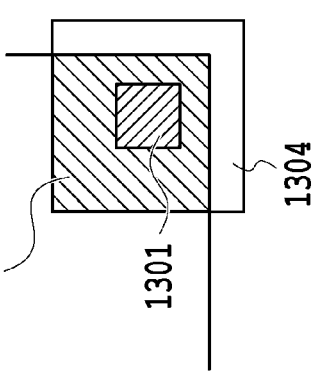
FIG.13A  FIG.13B  FIG.13C  FIG.13D  FIG.13E

REGION INFORMATION

| REGION | ITEM | VALUE |
|---|---|---|
| RED REGION | STARTING POINT x1 | |
| | STARTING POINT y1 | |
| | ENDPOINT x2 | |
| | ENDPOINT y2 | |
| PREDICTED RED-EYE REGION | CENTER x0 | |
| | CENTER y0 | |
| | RADIUS R | |
| CENTRAL REGION | NUMBER OF PIXELS IN REGION | |
| | NUMBER OF REFERENCE PIXELS | |
| DOUBLED PERIPHERAL REGION | NUMBER OF PIXELS IN REGION | |
| | NUMBER OF REFERENCE PIXELS | |
| TRIPLED PERIPHERAL REGION | NUMBER OF PIXELS IN REGION | |
| | NUMBER OF REFERENCE PIXELS | |
| QUINTUPLED PERIPHERAL REGION | NUMBER OF PIXELS IN REGION | |
| | NUMBER OF REFERENCE PIXELS | |

FIG.14A

FEATURE AMOUNT

| REGION | FEATURE AMOUNT | VALUE |
|---|---|---|
| CENTRAL REGION | AVERAGE RED COLOR EVALUATION VALUE (ER0ave) | |
| | MAXIMUM LUMINANCE Y0max | |
| | MAXIMUM SATURATION S0max | |
| DOUBLED PERIPHERAL REGION | MAXIMUM LUMINANCE Y2max | |
| | MINIMUM LUMINANCE Y2min | |
| | AVERAGE EDGE AMOUNT S02ave | |
| TRIPLED PERIPHERAL REGION | AVERAGE RED COLOR EVALUATION VALUE (ER3ave) | |
| QUINTUPLED PERIPHERAL REGION | AVERAGE LUMINANCE Y5ave | |
| | MAXIMUM LUMINANCE Y5max | |
| | MINIMUM LUMINANCE Y5min | |
| | SKIN-COLORED PIXEL RATIO RH5 | |
| | AVERAGE SATURATION S5ave | |

FIG.14B

| DETERMINATION EXPRESSION | MEANING |
|---|---|
| $TH1 < Y2max - Y2min$ | BECAUSE LUMINANCE ON PERIPHERY OF EYE CHANGES LARGELY |
| $SO2ave > TH2$ | BECAUSE LUMINANCE ON PERIPHERY OF EYE CHANGES LARGELY |
| $ER3ave < TH3 \times ER0ave$ | RED COLOR EVALUATION VALUE IS LOWER THAN THAT OF RED EYE ON PERIPHERY OF RED EYE |
| $TH4 < Y5ave < TH5$ | AVERAGE LUMINANCE VALUE ON PERIPHERY OF EYE FALLS WITHIN PREDETERMINED RANGE |
| $Y5max - Y5min < TH6$ | CHANGE IN LUMINANCE OF SKIN COLOR ON PERIPHERY OF EYE IS SMALL |
| $RH > TH7$ | NUMBER OF SKIN-COLORED PIXELS IS LARGE ON PERIPHERY OF EYE |
| $TH8 < Save < TH9$ | AVERAGE SATURATION OF SKIN COLOR ON PERIPHERY OF EYE FALLS WITHIN PREDETERMINED RANGE |

FIG.17

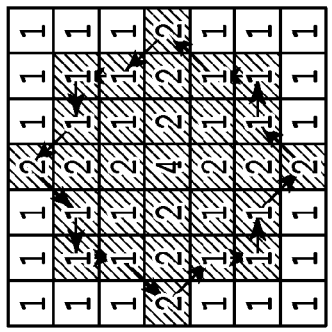
FIG.25D CALCULATION OF DIRECTION EDGE
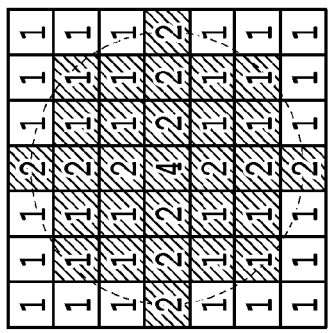
FIG.25C DRAWING OF INSCRIBED CIRCLE
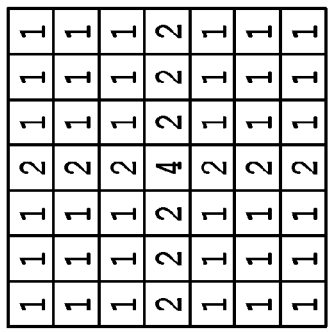
FIG.25B DUPLICATION FLAG IMAGE
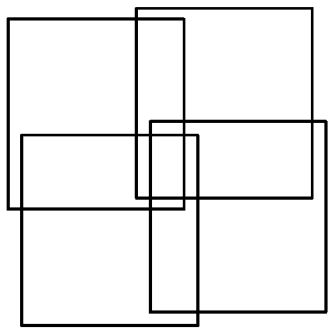
FIG.25A RED REGION

IMAGE PROCESSING APPARATUS, IMAGE PROCESSING METHOD, AND MEDIUM THAT DETERMINE WHETHER A CANDIDATE REGION OF A SPECIFIC REGION IN DIVIDED IMAGES FORMS THE SPECIFIC IMAGE, BASED ON SHAPE INFORMATION

CLAIM FOR PRIORITY

This application claims the benefit of Japanese Patent Application No. 2013-189614, filed Sep. 12, 2013, which is hereby incorporated by reference herein in its entirety.

FIELD OF THE INVENTION

The present invention relates to an image processing apparatus, an image processing method, and a medium. Specifically, the present invention relates to an image processing apparatus to which a technique to detect a specific object divided into a plurality of bands is applied, as well as to an image processing method, and a medium.

DESCRIPTION OF THE RELATED ART

Image data obtained by photographing by a digital camera, a still camera, or a camera-attached mobile telephone often includes an image quality defect due to the red-eye phenomenon and the backlight phenomenon. For such data, correction is performed by analyzing the image quality defect of the image data on a personal computer. For example, the specification of Japanese Patent No. 3707523 discloses a technique to correct image quality of image data.

SUMMARY OF THE INVENTION

For the reason of processing by a personal computer, however, one piece of image data is divided into a plurality of pieces of image data, in many cases. The reason is that data size becomes large as image data becomes large, and processing of image data as a whole increases the burden of a resource, such as a memory.

Here, in a case when image data representing one photo is divided into a plurality of pieces of image data, there is such a problem that it is not possible to correctly analyze and to correct an image quality defect by individually processing each of the plurality of pieces of image data at the time of analyzing the image quality defect. For example, in a case when a photo, in which a red-eye defect has occurred, is divided into two pieces of image data in such a manner that the red-eye region is divided, it is difficult to determine the red-eye region with high accuracy.

For this problem, a technique to grasp a plurality of pieces of image data as one piece of data is disclosed in the specification of Japanese Patent No. 3707523. The specification of Japanese Patent No. 3707523 discloses a technique to link the plurality of pieces of image data by determining the integrity of the image from the arrangement information of the image data and the contents information (e.g., color space, resolution, etc.). However, for images having no image defective region, the integrity is determined, and therefore, images having no image defect are also linked. This creates a problem that the memory and performance are wastefully used.

The present invention has been made in view of the above-described problems. An object of the present invention is to provide an image processing apparatus to which a technique capable of keeping at a high level the accuracy of analysis and correction of objects of a photo divided into a plurality of pieces of image data, while suppressing consumption of a memory, performance, etc., is applied, as well as an image processing method, and a medium.

The present invention is directed to an image processing apparatus comprising an acquisition unit configured to acquire a plurality of divided images, an extraction unit configured to extract a candidate region of a specific region in each of the plurality of images, a combining unit configured, in a case when candidate regions neighbor one another at the boundary in the plurality of images, to combine shape information of the plurality of neighboring candidate regions, and a determination unit configured to determine whether or not the plurality of candidate regions is a specific region by using the shape information combined by the combining unit.

By the present invention, it is made possible to keep, at a high level, the accuracy of analysis and correction of objects (e.g., image quality defects due to the red-eye phenomenon) of a photo divided into a plurality of pieces of image data, while suppressing consumption of a memory, performance, etc.

Further features of the present invention will become apparent from the following description of exemplary embodiments (with reference to the attached drawings).

BRIEF DESCRIPTION OF THE DRAWINGS

FIG. 10A to FIG. 10E are explanatory diagrams of boundary tracking processing in the first embodiment;

FIG. 11A to FIG. 11C are diagrams showing direction histograms in the first embodiment;

FIG. 12A and FIG. 12B are explanatory diagrams of processing to predict the center of a red eye and the radius of the red eye for a red region in the first embodiment;

FIG. 13A to FIG. 13E are explanatory diagrams of a central region and peripheral regions in the first embodiment;

FIG. 14A and FIG. 14B are diagrams representing region information and feature amounts in the first embodiment;

FIG. 17 is a diagram showing contents of feature amount determination in the first embodiment;

FIG. 25A to FIG. 25D are explanatory diagrams of the direction histogram addition processing in the third embodiment.

DESCRIPTION OF THE EMBODIMENTS

Hereafter, embodiments of the present invention are explained with reference to the drawings.

First Embodiment

In a first embodiment, as to a case when a red eye, which is an image quality defect, is divided into two pieces of image data, an example of a system for detecting and correcting a red eye is explained.

Figure 1:
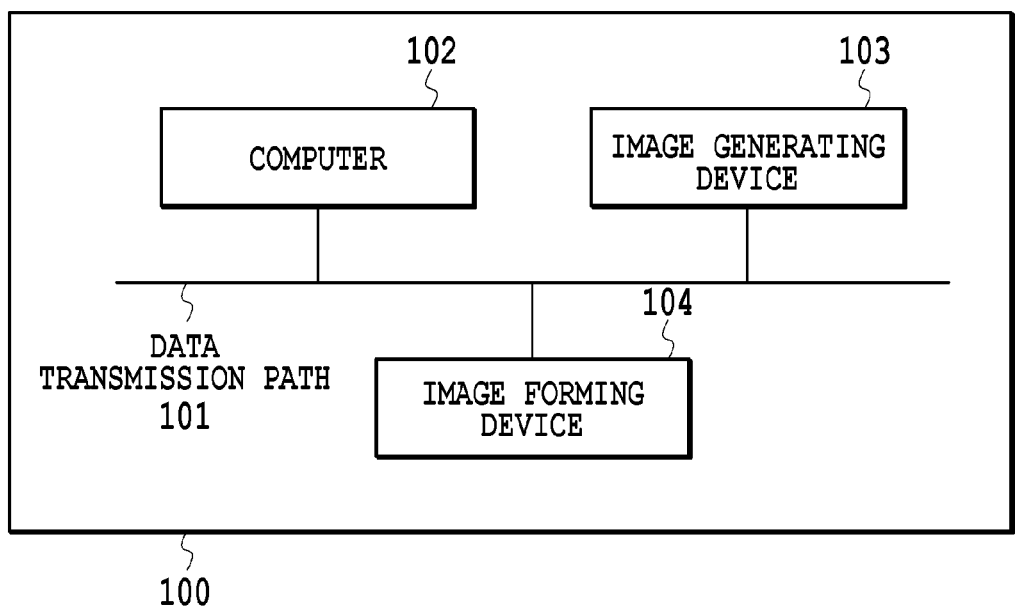
FIG. 1 is a configuration diagram of an image processing system including an image forming device according to a first embodiment.

FIG. 1 shows a configuration diagram of an image processing system including an image forming device in the present embodiment. An image processing system 100 includes a data transmission path 101, a computer 102, an image generating device 103, and an image forming device 104. The computer 102, the image generating device 103, and the image forming device 104 are connected via the data transmission path 101, and data can be transmitted and received therebetween.

The image generating device 103 is, for example, a device for generating and acquiring image data, such as a digital still camera and a scanner, and transmits image data to the computer 102 after acquiring the image data. The image forming device 104 is, for example, a printer that uses color materials, such as ink and toner. The computer 102 receives image data acquired by the image generating device 103 and stores the image data in a storage device inside the computer 102. Further, the computer 102 generates document data that can be output (printed) in the image forming device 104 upon receipt of instructions from a user. The document data includes image data stored in the storage device by the computer 102. Upon receipt of instructions to perform printing from a user, the computer 102 converts the document data into the format of a page description language (PDL) that can be interpreted by the image forming device 104, and transmits the data to the image forming device 104 via the data transmission path 101. The page description language (PDL) is a set of commands to specify a drawing region in which image data, graphic data, and character data are drawn on one page of a paper medium.

Figure 2:
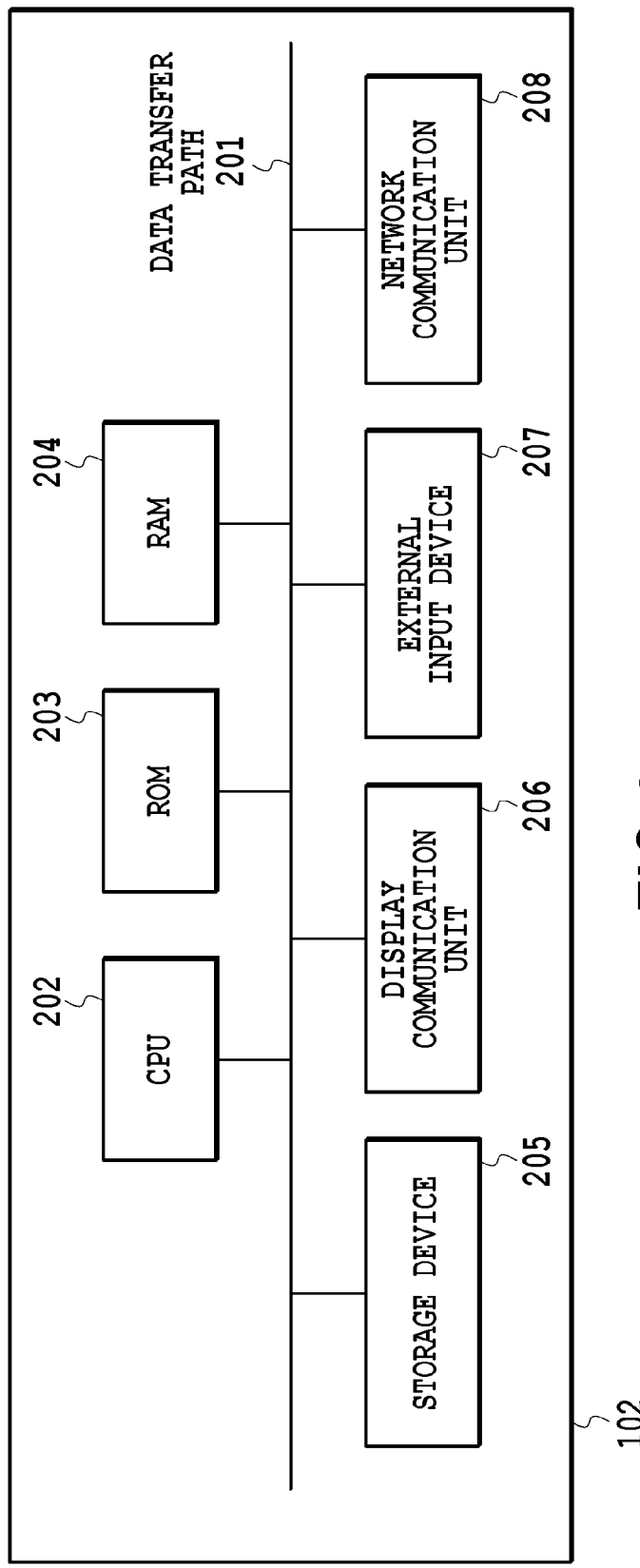
FIG. 2 is a hardware configuration diagram of a computer 102 in the first embodiment.

FIG. 2 shows a hardware configuration diagram of the computer 102 in the present embodiment. The computer 102 includes a data transfer path 201, a CPU 202, a ROM 203, a RAM 204, a storage device 205, a display communication unit 206, an external input device 207, and a network communication unit 208.

The CPU 202 loads programs stored in the ROM 203 onto the RAM 204, and executes the programs. Further, the CPU 202 sequentially loads programs, such as an operating system and applications, stored in the storage device 205, onto the RAM 204, and executes the programs. The network communication unit 208 transmits and receives data to and from another device within the image processing system 100 via the data transmission path 101. The CPU 202 receives image data acquired by the image generating device 103 via the network communication unit 208, and stores the image data in the storage device 205.

The display communication unit 206 receives information of a screen displayed by a program executed by the CPU 202 and displays the screen on a display, so that a user can visually recognize the screen.

Figure 3:
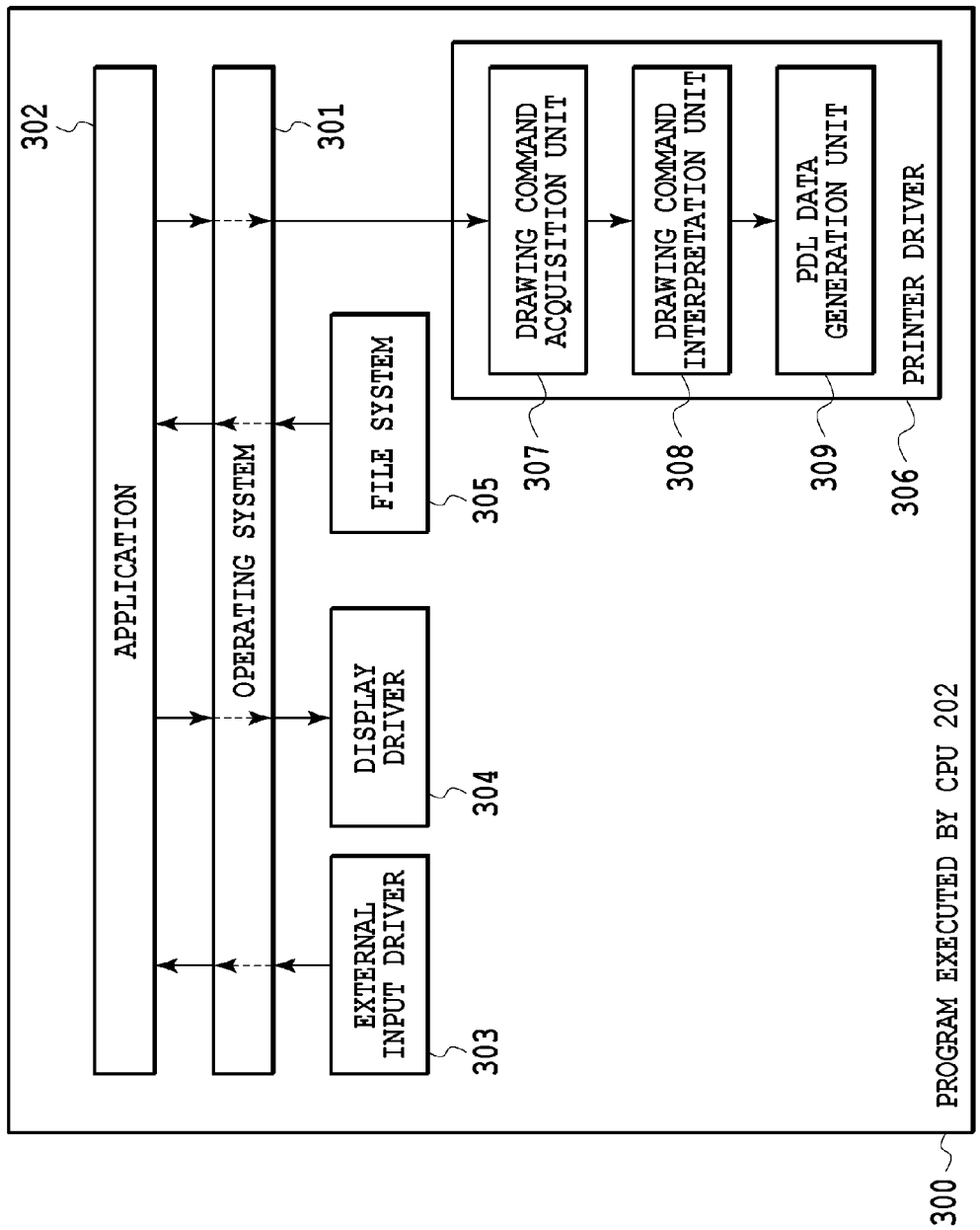
FIG. 3 is a configuration diagram of a program executed by a CPU 202 in the first embodiment.

The external input device 207 is a device for receiving instructions from a user, such as a keyboard and a mouse pointer. Upon receipt of instructions from a user through the external input device 207, the CPU 202 performs processing in accordance with the program being executed. FIG. 3 shows a configuration diagram of a program executed by the CPU 202. A program 300 executed by the CPU 202 includes an operating system 301, an application 302, an external input driver 303, a display driver 304, a file system 305, and a printer driver 306.

The CPU 202 reads these programs from the storage device 205, loads the programs onto the RAM 202, and then executes the programs. The CPU 202 notifies a preview showing the current edition state of document data to the display driver 304 in accordance with instructions of the application 302. The display driver 304 outputs the notified preview to the display communication unit 206 and displays the preview on the display. The external input driver 303 receives instructions from a user via the external input device 207 and notifies the contents of the instructions of the user to the CPU 202. The CPU 202 performs edition of the document data in correspondence to the instructions of the user in accordance with the application 302. The CPU 202 also receives image data stored in the storage device 205 from the file system 305 and attaches the image data to the document data in accordance with the application 302. The CPU 202 receives instructions to perform printing by a user from the external input driver 303 and transmits a drawing command of the document data to the printer driver 306 in accordance with the application 302.

The printer driver 306 includes a drawing command acquisition unit 307, a drawing command interpretation unit 308, and a PDL data generation unit 309. Upon receipt of the drawing command of document data from the operating system 301, the drawing command acquisition unit 307 transmits document data to the drawing command interpretation unit 308. The drawing command interpretation unit 308 interprets the drawing command of image data, graphics, characters, etc., output from the operation system 301. The PDL data generation unit 309 generates PDL data that can be interpreted by the image forming device 104. The generated PDL data is output to the network communication unit 208 and transmitted to the image forming device 104 via the data transmission path 101.

Figure 4:
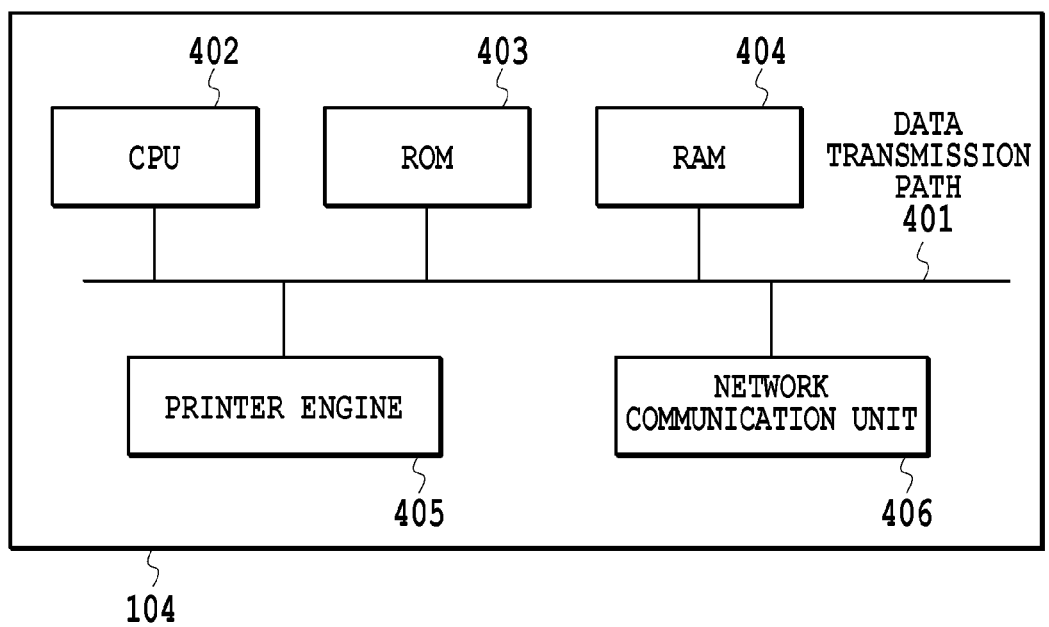
FIG. 4 is a hardware configuration diagram of an image forming device 104 in the first embodiment.

FIG. 4 shows a hardware configuration diagram of the image forming device 104 in the present embodiment. The image forming device 104 includes a data transmission path 401, a CPU 402, a ROM 403, a RAM 404, a printer engine 405, and a network communication unit 406. Via the data transmission path 401, the CPU 402, the ROM 403, the RAM 404, the printer engine 405, and the network communication unit 406 are connected, and data can be transmitted and received therebetween.

In the ROM 403, programs are stored, which are used to interpret the page description language, to perform image processing, and to output an image signal to the printer engine 405. The CPU 402 reads the programs from the ROM 403, loads the programs onto the RAM 404, and then executes the programs. The RAM 404 also provides a work memory and an image buffer necessary for the CPU 402 to execute the programs. The network communication unit 406 receives PDL data output from the computer 102 and transmits the PDL data to the CPU 402. The printer engine 405 receives an image signal of the engine resolution configured by binary signals of color materials (cyan, magenta, yellow, black) from the CPU 402. Then, the printer engine 405 scans the photoconductor with laser by performing pulse width modulation (PWM) control to form a latent image on the photoconductor, and then, fixes the latent image by applying color materials onto a paper medium, and thus forms an image.

Figure 5:
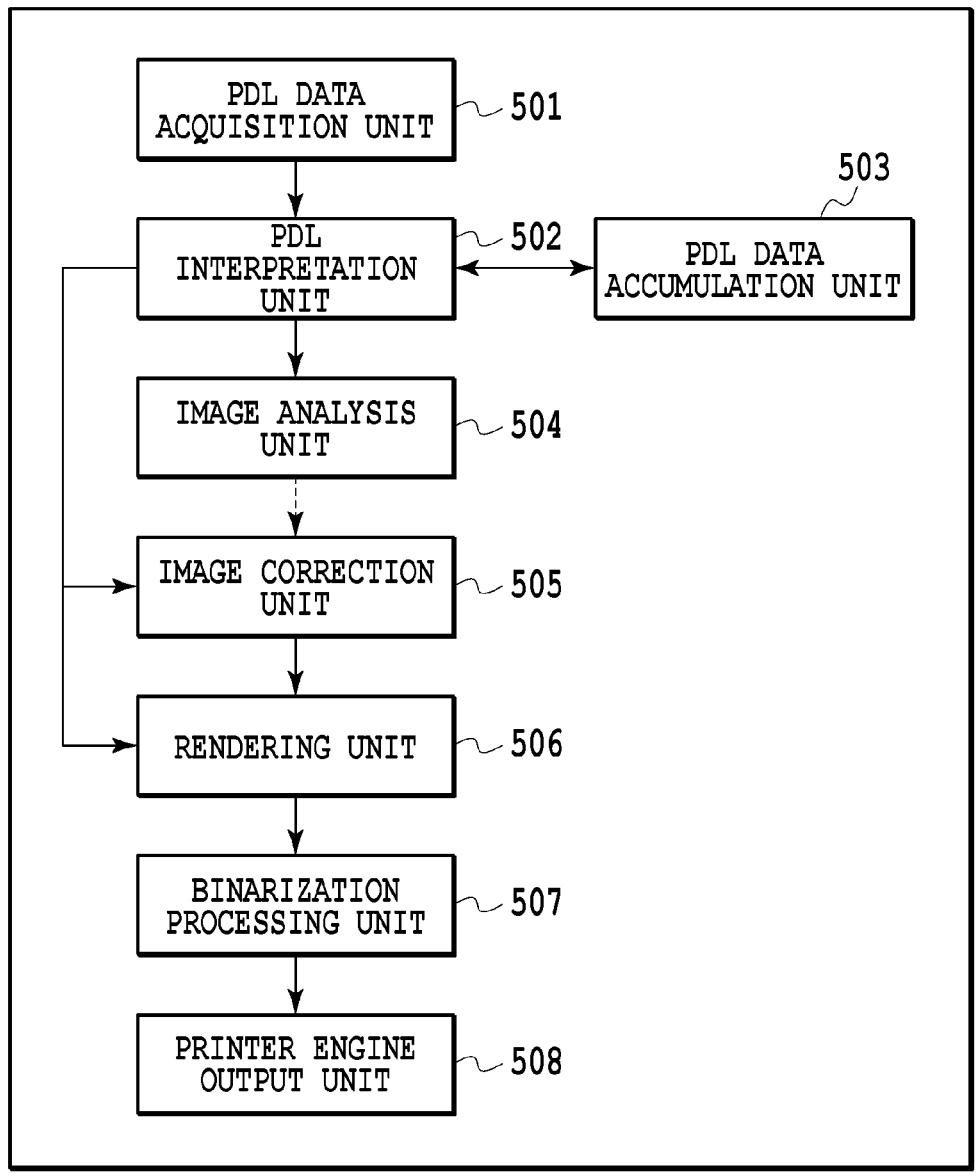
FIG. 5 is a configuration diagram of a program executed by a CPU 402 in the first embodiment.

FIG. 5 shows a configuration diagram of a program executed by the CPU 402 in the present embodiment. A PDL data acquisition unit 501 acquires PDL data that the network communication unit 406 has received from the computer 102 and outputs the PDL data to a PDL interpretation unit 502. The PDL interpretation unit 502 interprets the PDL data and outputs the PDL data to a PDL data accumulation unit 503. The PDL data accumulation unit 503 stores PDL data corresponding to one page. The PDL interpretation unit 502 outputs the image data included in the PDL data also to an image analysis unit 504. The image analysis unit 504 detects a red-eye defective region in the image data, calculates correction parameters, and outputs the parameters to an image correction unit 505. In a case when the PDL interpretation unit 502 detects a page delimiter within the PDL data, the PDL interpretation unit 502 notifies the image analysis unit 504 that the page end is reached. Then, the PDL interpretation unit 502 acquires the accumulated PDL data corresponding to one page from the PDL data accumulation unit 503. The PDL interpretation unit 502 delivers the image data to the image analysis unit 504, and directly outputs character data and graphic data to a rendering unit 506. The image correction unit 505 corrects the image quality defect of the image data based on the correction parameters received from the image analysis unit 504 and outputs the corrected image data to the rendering unit 506. The rendering unit 506 rasterizes the image data, character data, and graphic data into one page image, and outputs the page image to a binarization processing unit 507. The binarization processing unit 507 performs halftone processing to generate a binary image signal for each color material and outputs the signal to a printer engine output unit 508. The printer engine output unit 508 transmits the binary image signal to the printer engine 405 as a pulse width modulation (PWM) signal. Then, the printer engine 405 transfers and fixes the color materials onto the paper medium, and thus, forms an image.

Figure 6:
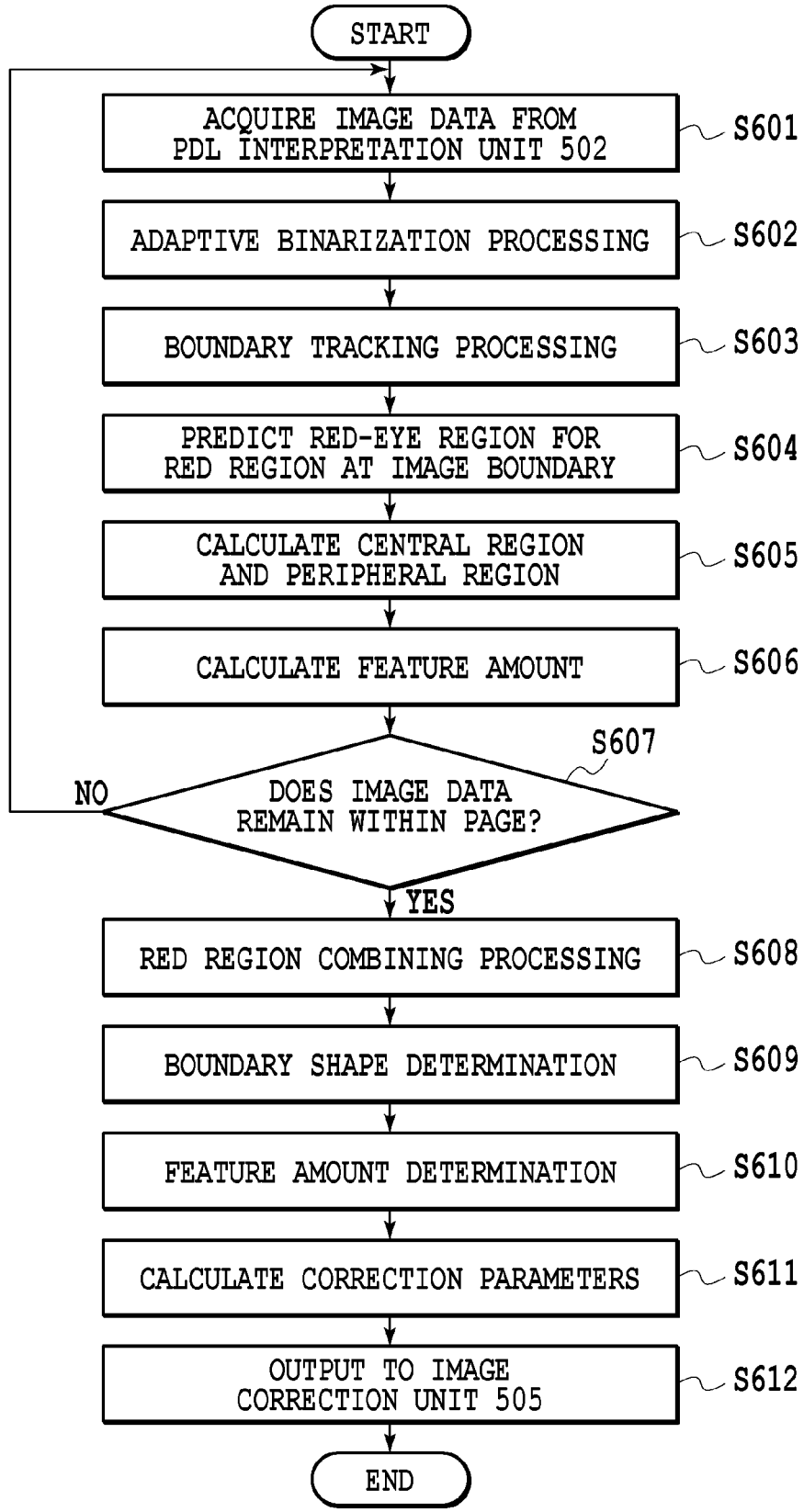
FIG. 6 is a flowchart of processing performed by an image analysis unit 504 in the first embodiment.

FIG. 6 shows a flowchart of processing performed by the image analysis unit 504 in the first embodiment.

First, at step S601, the image analysis unit 504 acquires a plurality of pieces of image data, into which data of one image is divided, from the PDL interpretation unit 502.

Next, at step S602, the image analysis unit 504 determines red pixels by performing adaptive binarization processing on the plurality of pieces of image data acquired at step S601.

Next, at step S603, the image analysis unit 504 extracts a red region by performing boundary tracking processing on the plurality of pieces of image data acquired at step S601 and calculates contour information.

Next, at step S604, the image analysis unit 504 predicts a red-eye region for the red region at the image boundary.

Next, at step S605, the image analysis unit 504 calculates a central region and a peripheral region.

Next, at step S606, the image analysis unit 504 calculates a feature amount.

Next, at step S607, the image analysis unit 504 determines whether image data remains within the page by inquiring the PDL interpretation unit 502. In a case when image data still remains within the page, the processing returns to step S601, and in the case when no image data remains within the page, the processing proceeds to step S608.

At step S608, the image analysis unit 504 performs candidate region combining processing. Specifically, in the case when candidate regions are adjacent to each other at the boundaries in a plurality of images, it is possible to determine that the degree of integrity of the candidate regions is high, and therefore, the image analysis unit 504 combines the candidate regions by adding the region information, the contour information, and the feature amount.

Next, at step S609, the image analysis unit 504 performs boundary shape determination as to the combined candidate region and registers the candidate region whose boundary shape is circular as a red-eye candidate.

Next, at step S610, the image analysis unit 504 determines the feature amount and registers the red-eye candidate that satisfies the condition of the feature amount of the red-eye in a list as a red eye (specific region).

Next, at step S611, the image analysis unit 504 calculates correction parameters.

Finally, at step S612, the image analysis unit 504 outputs a list of the red-eye and correction parameters thereof to the image correction unit 505. Details of each piece of processing will be explained sequentially.

Figure 7B:
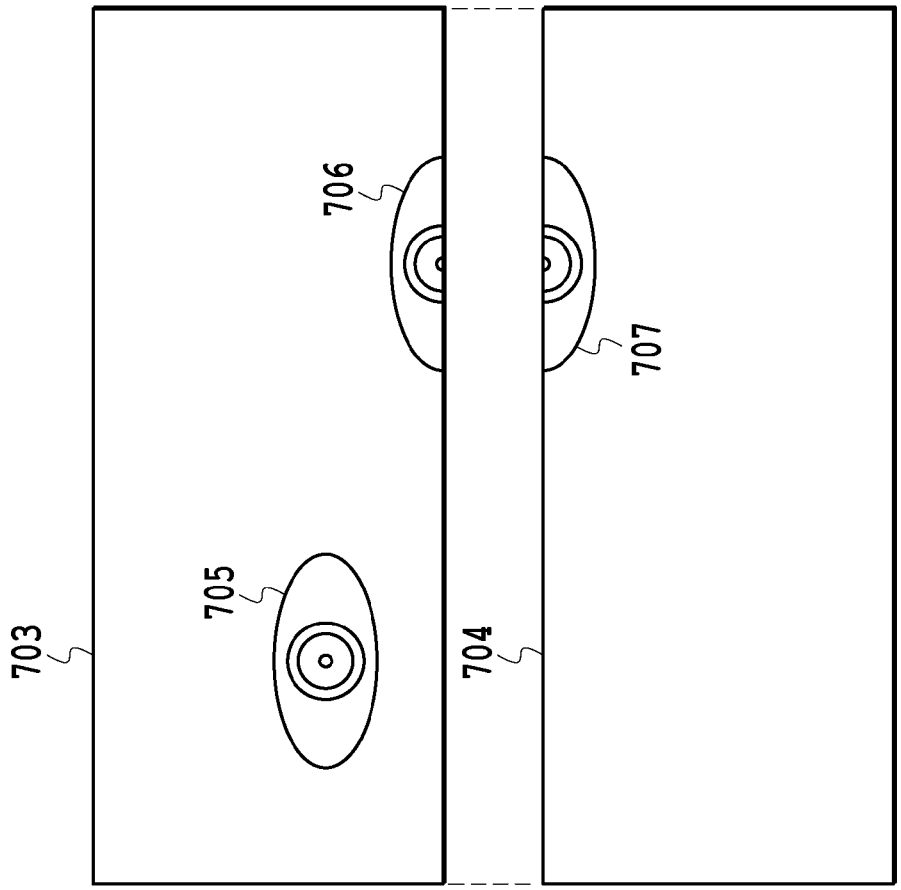
FIG. 7A and FIG. 7B are diagrams showing an example of page description language (PDL) data in the first embodiment.
Figure 7A:
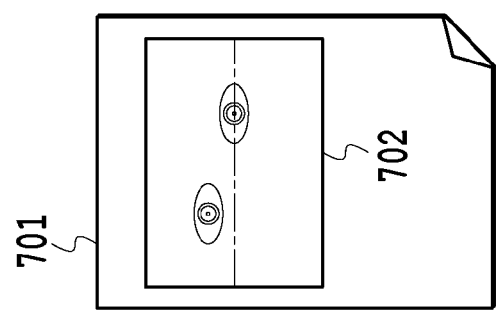

FIG. 7A and FIG. 7B show an example of PDL data in the first embodiment. In FIG. 7A, a preview of PDL data is represented, and a photo 702 having two red eyes is attached into a page 701. FIG. 7B is a diagram (enlarged diagram of an image to be drawn) for explaining image data configuring the photo 702 and shows an example in which the photo 702 includes an image 703 and an image 704. The image 703 includes a red eye 705 and a red eye 706. The whole of the red eye 705 exists inside the image 703. The red eye 706 exists at the boundary of the image 703, in a shape in which the lower half is missing. The image 704 includes a red eye 707. The red eye 707 exists at the boundary of the image 704, in a shape in which the upper half is missing.

<Adaptive Binarization Processing>

In the adaptive binarization processing (step S602), by applying the adaptive binarization processing to the input image data, the red region is extracted from an image. "Binarization" referred to here means assigning "1" to pixels determined to be red and "0" to other pixels determined not to be red. In order to determine whether or not a pixel is red, a red color evaluation amount ER is calculated, and is compared with a predetermined threshold value. The red color evaluation amount ER is defined by expression (1) below.

$$ER=(R-G)/R. \quad (1)$$

Figure 8:
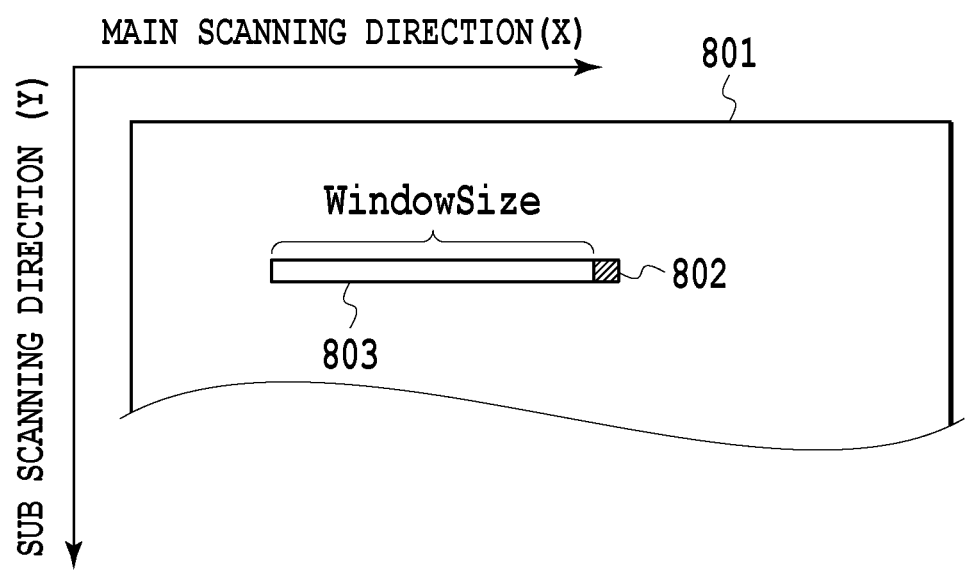
FIG. 8 is an explanatory diagram of adaptive binarization processing in the first embodiment.

With reference to FIG. 8, the expression (1) is explained. The expression (1) means that the degree of red of a pixel of interest 802 is found from the two components R and G, excluding the B component, not from the saturation of the general HSI system. In the above-described expression (1), the ratio of (R−G) to the R component is taken to be the evaluation value ER, but the evaluation value ER is not limited to this and, for example, only (R−G) or R/G may be taken to be the evaluation value ER. For binarization of the pixel of interest 802 in FIG. 8, a window region 803 is set on the same line of the pixel of interest 802, in which the number of pixels in the left direction (in the opposite direction of the main scanning direction) with respect to the pixel of interest 802 is WindowSize. An average value ERave of the red color evaluation amounts ER of the pixels within the window is found. The evaluation amount ER is calculated only in the case when condition (2) below is satisfied, and therefore, the evaluation amount ER does not become negative.

$$R>0 \text{ and } R>G. \tag{2}$$

By using the average value ERave, the pixel of interest 802 is binarized in accordance with expression (3) below.

$$ER \geq ERave+Margin\_RGB, \text{ then '1'}$$

$$ER \leq ERave+Margin\_RGB, \text{ then '0'}. \tag{3}$$

The above processing is performed on all of the pixels for each line of the input image data by moving the pixel of interest 802 from left to right. Further, it is also possible to increase the accuracy of adaptive binarization by performing the same processing for each line of the input image data from right to left and by calculating the AND of the results.

Figure 9:
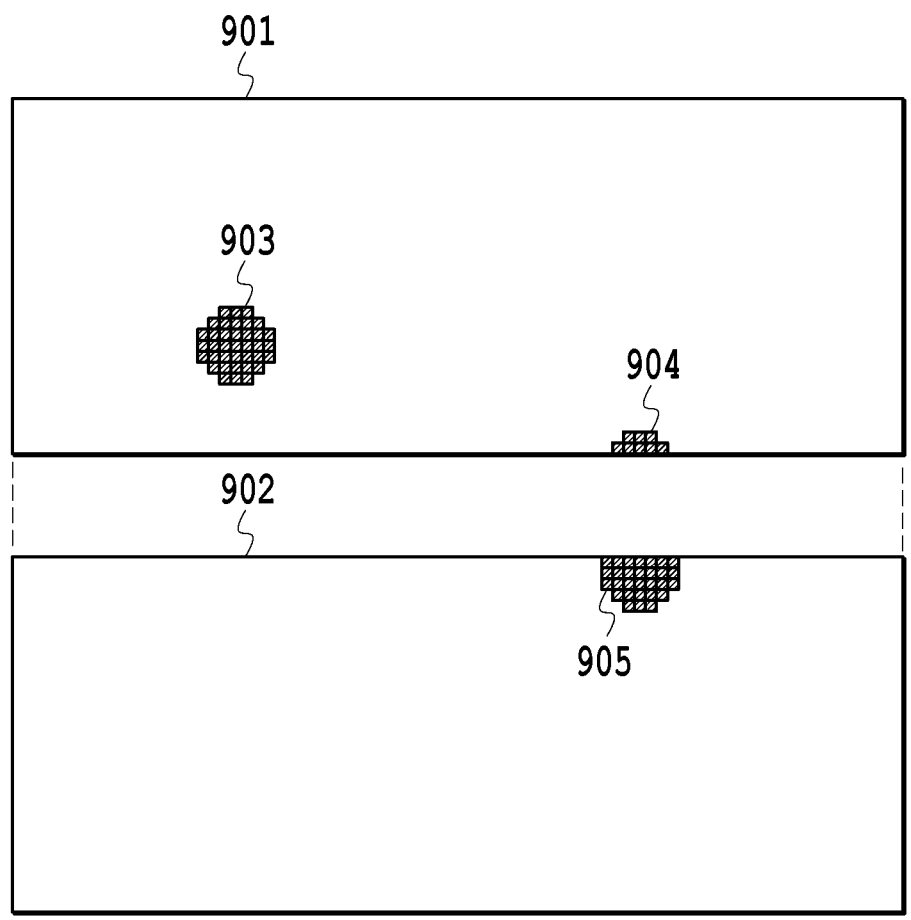
FIG. 9 is a diagram showing an example of a result of the adaptive binarization processing in the first embodiment.

FIG. 9 shows an example of the results of performing the adaptive binarization processing on the image data in FIG. 7B. An image 901 shows a binary image after the adaptive binarization processing, corresponding to the image 703, and an image 902 shows a binary image after the adaptive binarization processing, corresponding to the image 704. FIG. 9 shows the way red regions 903, 904, and 905 are extracted by the adaptive binarization processing.

<Boundary Tracking Processing>

FIG. 10A to FIG. 10E show explanatory diagrams of boundary tracking processing (step S603). The boundary tracking processing is processing to scan a binary image obtained as the result of the adaptive binarization processing in the main and sub scanning directions from the top end. As shown in FIG. 10A, in a case when the value of a pixel of interest (x, y) is '1' and the values of four pixels, i.e., a pixel (x−1, y) to the left of, a pixel (x−1, y−1) obliquely left above, a pixel (x, y−1) above, and a pixel (x−1, y−1) obliquely right above the pixel of interest, are '0', the pixel of interest is taken to be the scan starting point. Further, as shown in FIG. 10(B), also in a case when the pixel of interest is at the top end of the image and the value of the pixel (x−1, y) to the left of the pixel of interest is '0', the pixel of interest is taken to be the scan starting point. Furthermore, as shown in FIG. 10C, also in a case when the pixel of interest is at the left end of the image and the value of the pixel (x, y−1) above the pixel of interest is '0', the pixel of interest is taken to be the scan starting point. Pixels denoted by symbols 1001-1004 in FIGS. 10A to 10D are the pixels of the scan starting points. In FIGS. 10A to 10D, the coordinate system in which the upper left point of the binary image is taken to be the origin is set.

First, the boundary tracking processing is explained as to FIG. 10A. From the starting point pixel 1001 until the starting point 1001 is reached again in the counterclockwise direction, the pixel whose value is '1' is tracked. On the way of tracking, in a case when the image region is deviated or when the Y coordinate becomes less than that of the starting point pixel 1001, the tracking is aborted and the next starting point is searched. The reason tracking is aborted in a case when the Y coordinate becomes less than that of the starting point pixel 1001 on the way of tracking is that it is intended to prevent erroneous tracking inside of the annular red region as shown in FIG. 10D. In a case when tracking is performed inside of the annular region, the Y coordinate becomes less than that of the starting point pixel 1004 at the time of the pixel 1005 being reached in FIG. 10D, and therefore, tracking processing is aborted at this point of time. The results of the boundary tracking in the red regions 903, 904, and 905 in FIG. 9 are shown in FIGS. 10A to 10C. Here, in the tracking process, a vector in the tracking direction is extracted as a direction edge. This direction edge is represented by eight directions shown in FIG. 10E and a histogram accumulated by tracking is calculated as a direction histogram. The direction histogram represents shape information of the red region.

Here, it should be noted that the examples shown in FIG. 10B and FIG. 10C are binary images of the image data in which the red eye is divided, and therefore, the direction edge in contact with the end part of the image has no meaning as shape information. Because of this, the direction edge in contact with the end part of the image is excluded from the count at the time of creating the direction histogram. The excluded direction edge is described in the row of Exclusion of the direction histogram as shown in FIGS. 11A to 11C. FIGS. 11A to 11C show the direction histograms calculated for the examples shown in FIGS. 10A to 10C. In the above-described tracking process, it is possible to obtain the direction histogram, the maximum value (=x2) and the minimum value (=x1) of the X coordinate, and the maximum value (=y2) and the minimum value (=y1) of the Y coordinate. The maximum values and the minimum values of the X and Y coordinates represent region information of the red region. In detail, as shown in FIG. 10A, the maximum values and the minimum values of the X and Y coordinates represent the region in which the pixel whose value is '1' exists, i.e., the circumscribed rectangular region of the red region.

<Prediction of Red-Eye Region for Red Region at Image Boundary>

Next, the processing to predict the red-eye region (step S604) performed on the red region at the image boundary is explained. In a case of the red region inside of an image, the red region itself is the red-eye region, and therefore, prediction is not necessary in particular. In contrast to this, as to the red region at the image boundary, it is necessary to determine the peripheral region to be referred to at the time of calculation of the feature amount by predicting the position and size of the actual red eye.

The prediction of the red-eye region is performed by calculating the predicted center and the predicted radius of the red eye. However, the calculation method is different depending on whether the center of the red eye is inside of or outside of the red region.

As to the red region in contact with the image lower end or the image upper end, in a case when expression (4) below is satisfied, it is determined that the center of the red eye is inside the red region.

$$(x2-x1)/2 \leq (y2-y1). \tag{4}$$

Here, (x1, y1) indicates the starting point of the red region and (x2, y2) indicates the endpoint of the red region. For example, the red region shown in FIG. 12B satisfies the expression (4), and, therefore, it is possible to determine that the center of the red eye is inside of the red region. The radius of the red eye becomes equal to (x2−x1)/2 and it is possible to express center coordinates (x0, y0) of the red eye by expression (5) below.

$$(x0,y0)=((x1+x2)/2,y2-(x2-x1)/2). \tag{5}$$

On the other hand, in a case when the expression (4) is not satisfied, as shown in FIG. 12A, it is possible to determine that the center of the red eye is located outside of the red region. The circle whose chord is a straight line connecting (x1, y2) and ((x1+x2)/2, y1) is predicted as the region of the red eye, and the center of the circle is predicted as the center of the red eye. In order to calculate the coordinates of the center of the red eye, a straight line that passes the midpoint of (x1, y2) and ((x1+x2)/2, y1), i.e., ((3x1+x2)/4, (y1+y2)/2) and that is perpendicular to a straight line connecting (x1, y2) and ((x1+x2)/2, y1) is found. An expression of this straight line is expressed by expression (6) below.

$$y-(y1+y2)/2=\{(x1-x2)/2(y2-y1)\}\{x-(3x1+x2)/4\}. \quad (6)$$

The intersection of this line and a straight line expressed by expression (7) below:

$$x=(x1+x2)/2. \quad (7)$$

is the center of the circle (center of the red eye). Consequently, the center of the red eye is expressed as $$x0=(x1x2)/2. \quad (8)$$

$$y0=\{4(y1+y2)(y2-y1)+(x1-x2)(x2-x1)\}/8(y2-y1). \quad (9)$$

Consequently, a radius R of the red eye is $$R=\{4(y1+y2)(y2-y1)+(x1-x2)(x2-x1)\}/8(y2-y1)-y1. \quad (10)$$

It is possible to predict the region of the red eye by calculating the predicted center and the predicted radius of the red eye by the above procedure.

<Definition and Calculation of Central Region and Peripheral Region>

Next, the processing to calculate the central region and the peripheral region of the red eye in the red region (step S605) is explained. FIGS. 13A to 13E are diagrams for explaining a central region and peripheral regions used at the time of calculating the feature amount of the red region.

In FIG. 13A, a central region 1301 represents the red region calculated by the boundary tracking processing and the predicted red-eye region in the case of the red region at the image boundary. However, in a case when the feature amount of the central region 1301 is calculated, only the pixels in an inner rhombic region 1302 are referenced. The reason is that the red-eye region in the central region 1301 is an inscribed circle of the central region 1301. Here, a rhombus is used as the reference region for simplification of calculation, but it may also be possible to refer to the inscribed circle in place of the rhombus. The peripheral regions are regions obtained by doubling, tripling, and quintupling the longitudinal and transverse sizes of the central region 1301 toward the periphery with the central region 1301 as a center. The peripheral region for each magnification is shown in each of FIGS. 13B to 13D.

FIG. 13E shows an explanatory diagram of the central region and the peripheral region in the case when a red-eye candidate region exists in the vicinity of the end part of the image. FIG. 13E shows an example in which the central region 1301 of the red-eye candidate region exists in the vicinity of the right end of the image with somewhat of a margin left. In this example, in a case when the pixel, even if one, exists within each block of the peripheral region, the feature amount is calculated by using the pixel. For example, in the example shown in FIG. 13E, the feature amount calculation region in the tripled peripheral region is a region 1306. This is the same with the peripheral regions enlarged with other magnifications and the central region and in a case when the pixel, even if one, exists within the region, the feature amount is calculated by using the pixel within the region.

FIG. 14A and FIG. 14B are diagrams showing the region information and the feature amount. FIG. 14A is a diagram showing the region information to be held for each red region. The information such as this is held as red region information.

<Calculation of Feature Amount>

FIG. 14B shows a list of the feature amounts to be calculated for each red region. Luminance, hue, and saturation are calculated from RGB values of the image by using expressions (11) to (13) below.

Expression (11) of calculation method of RGB–YCC (luminance):

$$Y=0.299R+0.587G+0.114B$$

$$Cb=-0.169R-0.331G+0.500B$$

$$Cr=0.500R-0.419G-0.081B$$

Expression (12) of calculation method of H (hue):

$$H=(360/2\pi)\arctan(Cr/Cb)$$

Expression (13) of calculation method of S (saturation):

$$S=\sqrt{(Cb^2Cr^2)}$$

The edge amount is calculated for the luminance value by using a Sobel filter. On the assumption that the pixel value of coordinates (i, j) is p(i, j), the Sobel filter is expressed by expression (14) below.

Expression (14) of Sobel filter calculation method:

$$SO=(-1)\times p(i-1,j-1)+1\times p(i+1,j-1)+(-2)\times p(i-1,j)+2\times p(i+1,j)+(-1)\times p(i-1,j-1)+1\times p(i+1,j1)$$

A skin-colored pixel ratio RH indicates a ratio in which the pixels included in the skin-colored hue range exist within the quintupled peripheral region. The skin-colored hue range is a range obtained from experience.

<Combining Processing of Red Regions>

Figure 15:
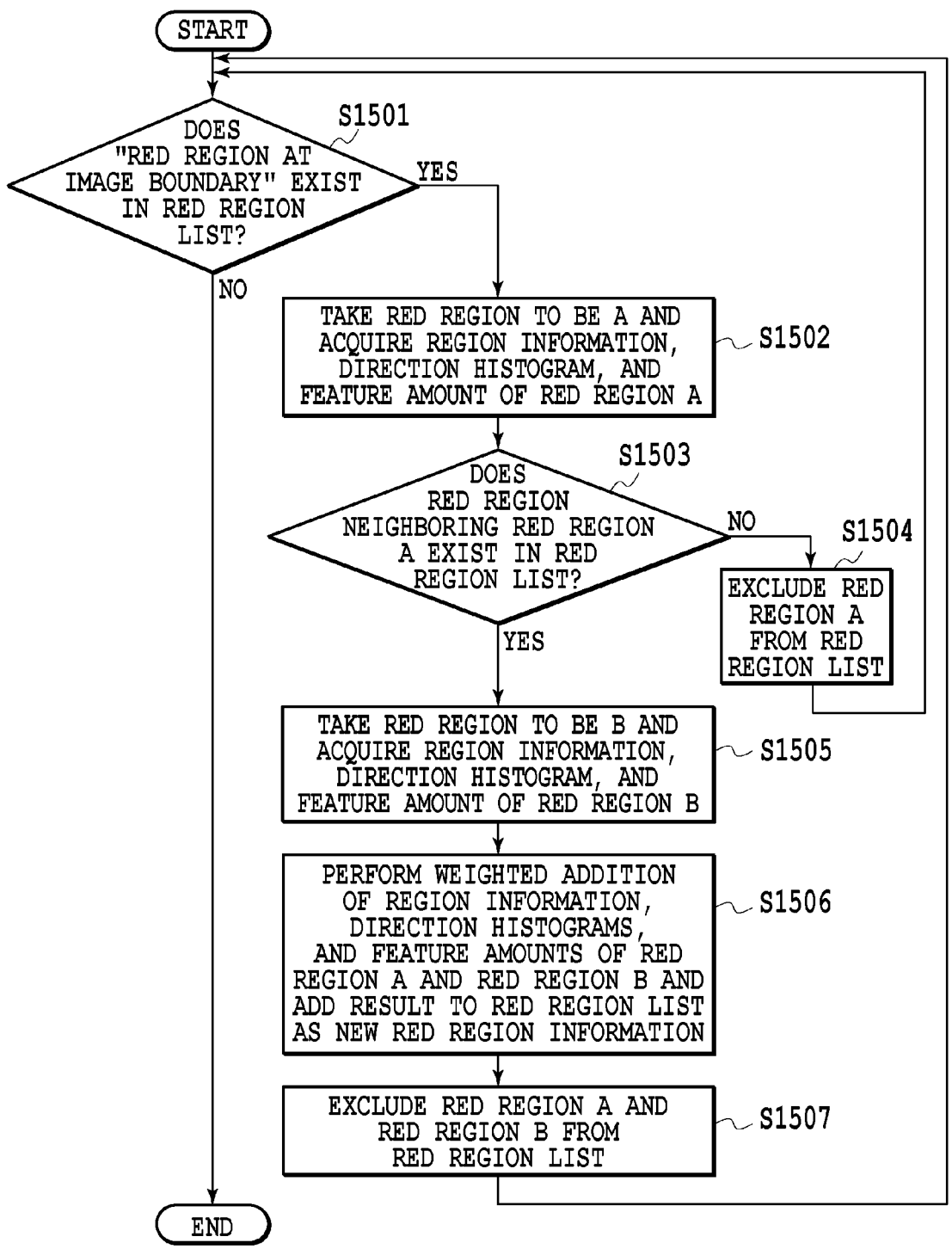
FIG. 15 is a flowchart of combining processing of red regions at an image boundary in the first embodiment.

After extraction of the red regions and calculation of the feature amounts are completed for all of the image data within a page, next, combining processing of the red regions at the image boundary (step S608) is performed. FIG. 15 shows a flowchart of the combining processing of red regions at the image boundary.

First, at step S1501, whether or not the "red region at the image boundary" exists in the red region list is determined. In a case when the "red region at the image boundary" does not exist in the red region list, the processing is exited, and in a case when the "red region at the image boundary" exists in the red region list, the processing proceeds to step S1502.

At step S1502, the red region found at step S1501 is taken to be a red region (candidate region) A and the region information, the direction histogram (shape information), and the feature amount of the red region A are acquired.

Next, at step S1503, whether or not another "red region at the image boundary" adjacent to the red region A exists in the red region list is determined. In a case when a "red region at the image boundary" adjacent to the red region A does not exist in the red region list, the processing proceeds to step S1504. In a case when a "red region at the image boundary" adjacent to the red region A exists in the red region list, the processing proceeds to step S1505.

At step S1504, the red region A is excluded from the red region list and the processing returns to step S1501.

At step S1505, the red region found at step S1503 is taken to be a red region (candidate region) B and the region information, the direction histogram (shape information), and the feature amount of the red region B are acquired.

Next, at step S1506, the region information, the direction histograms, and the feature amounts of the red region A and the red region B are added with weights, and the sum is added to the red region list as new red region information. Here, the addition method of the region information, the direction histograms, and the feature amounts is explained in detail. As to the region information, the starting point and the endpoint of the circumscribed rectangle after the regions are combined are taken to be new region information after the addition. As to the direction histogram, by adding the value in each edge direction, the direction histogram after the addition is obtained. As to the feature amount, each value is added by giving a weight to each value in accordance with the "number of reference pixels" at the time of calculation of each feature amount. For example, in a case when the value of a feature amount P of the red region A is taken to be Pa and the number of reference pixels thereof to be Na, and the value of the feature amount P of the red region B is taken to be Pb and the number of reference pixels thereof to be Nb, an expression of the weighted addition is $$P\text{sum}=(Pa*Na+Pb*Nb)/(Na+Nb). \quad (15)$$

Psum is a value of the feature amount after the weighted addition. This calculation is performed for all the feature amounts.

Finally, at step S1507, the red region A and the red region B are excluded from the red region list and the processing returns to step S1501. By repeatedly performing steps S1501 to S1507, the combining processing of the red regions at the image boundary is completed finally, and in the red region list, only the red regions in which no part is missing are left as a result.

<Boundary Shape Determination>

Figure 16:
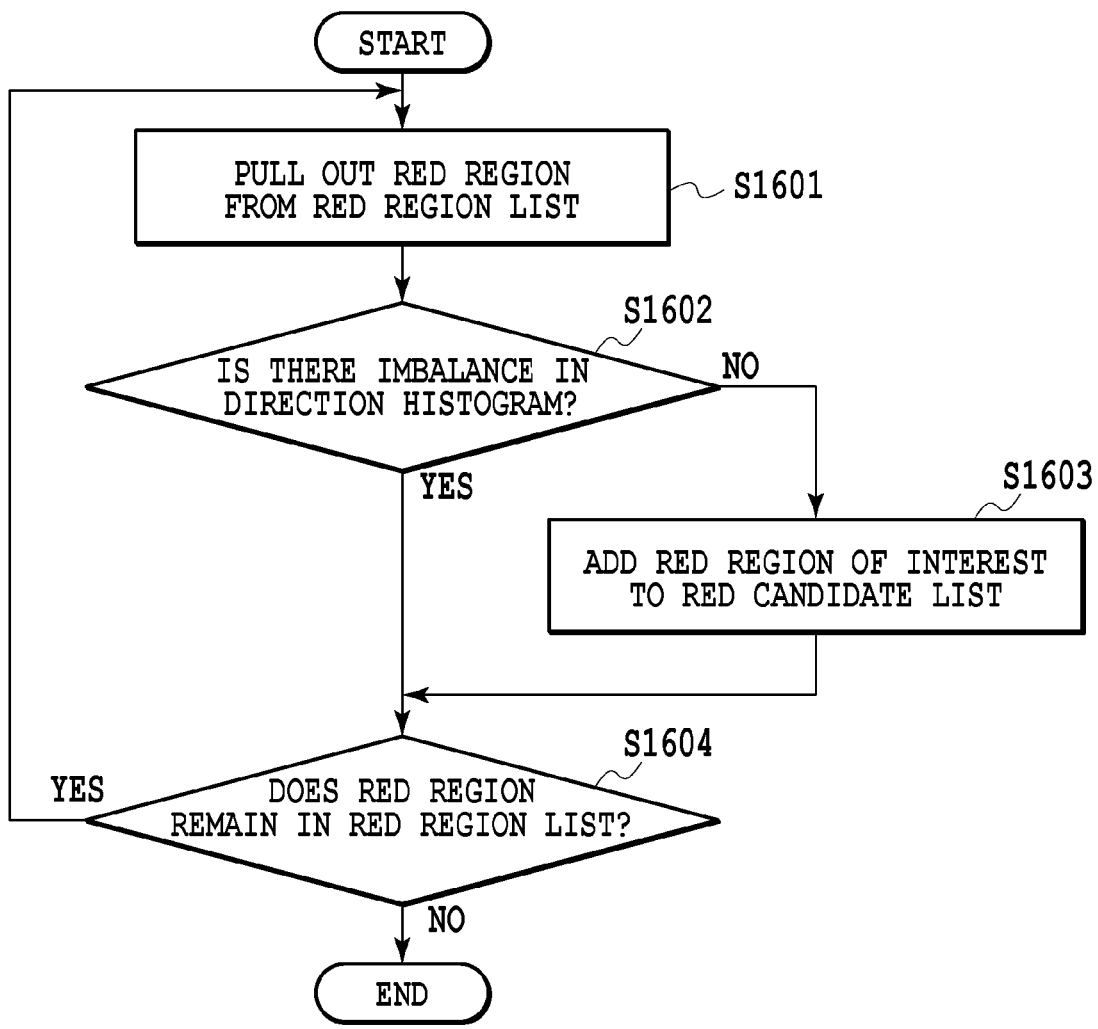
FIG. 16 is a flowchart of boundary shape determination processing in the first embodiment.

FIG. 16 shows a flowchart of processing of the boundary shape determination (step S609) in the present embodiment.

First, at step S1601, the red region is pulled out from the red region list.

Next, at step S1602, a determination as to the imbalance in the direction histogram is performed. As already explained, in the process of the boundary tracking, it is possible to obtain the direction histograms as shown in FIGS. 11A to 11C. In a case when the target region of the boundary tracking is close to a circle, the distribution of the direction histogram in the eight directions obtained from the results of the tracking processing will be a balanced one, but in the case of an elongated target region etc., an imbalance occurs in the direction histogram. For example, in a case when the target region has a shape elongated from the top right toward the bottom right, the frequency is remarkably high in the direction 2 and in the direction 6, and the frequency is low in the direction 4 and in the direction 8, of the directions shown in FIG. 10E. Consequently, in a case when all of the conditions expressed in expression (15) below are satisfied, it is determined that the red region of interest is a red circle region, and in a case when any one of the conditions is not satisfied, it is determined that the red region of interest is not a red circle region.

Expression (15) of red circle region determination method:

$$\text{sum}(f1,f2,f5,f6)<\Sigma fxTh\_BF\_\text{DirectRatio}$$

$$\text{sum}(f2,f3,f6,f7)<\Sigma fxTh\_BF\_\text{DirectRatio}$$

$$\text{sum}(f3,f4,f7,f8)<\Sigma fxTh\_BF\_\text{DirectRatio}$$

$$\text{sum}(f4,f5,f8,f1)<\Sigma fxTh\_BF\_\text{DirectRatio}$$

Here, fn denotes the frequency in the direction n, sum (fa, fb, fc, fd) denotes the sum of the frequencies in the directions a, b, c, and d, and Σf denotes the total sum of frequencies. In a case when the sum of the frequencies found for certain directions from the expression (15) is greater than a predetermined ratio, i.e., there is centralization in certain directions, it is determined that the red region of interest is not a red circle region, and the processing proceeds to step S1604. In a case when there is no centralization in any direction, it is deter-mined that the red region of interest is a red circle region, and the processing proceeds to step S1603.

At step S1603, the red region of interest is added to the red-eye candidate list. The determination by the expression (15) has a possibility of a reduction in determination accuracy in a case when the total sum f of frequencies is small, and therefore, it may also be possible to add the red region of interest to the candidate region list in a case when the total sum a of frequencies is equal to or less than a predetermined value.

Next, at step S1604, whether or not the red region remains in the red region list is determined. In a case when the red region remains, the processing returns to step S1601 and in a case when the red region does not remain, the series of flow is exited.

<Feature Amount Determination>

FIG. 17 shows the contents of the feature amount determination in the present embodiment. In a case when all of the determination results in this table are true for each red-eye candidate, it is determined that the red-eye candidate is a red eye, and added to the red-eye list. Here, TH1 to TH9 are predetermined values and parameters found experimentally.

<Calculation of Correction Parameters>

For the candidate determined to be a red eye, correction parameters are calculated (step S611). In the present embodiment, as the correction parameters, maximum luminance Y0max and maximum saturation S0max in the central region in the feature amount are utilized (see FIG. 14B). Consequently, in the red-eye list, the maximum luminance Y0max and the maximum saturation S0max are stored in association with the red-eye region.

<Processing Performed by Image Correction Unit 505>

Figure 18:
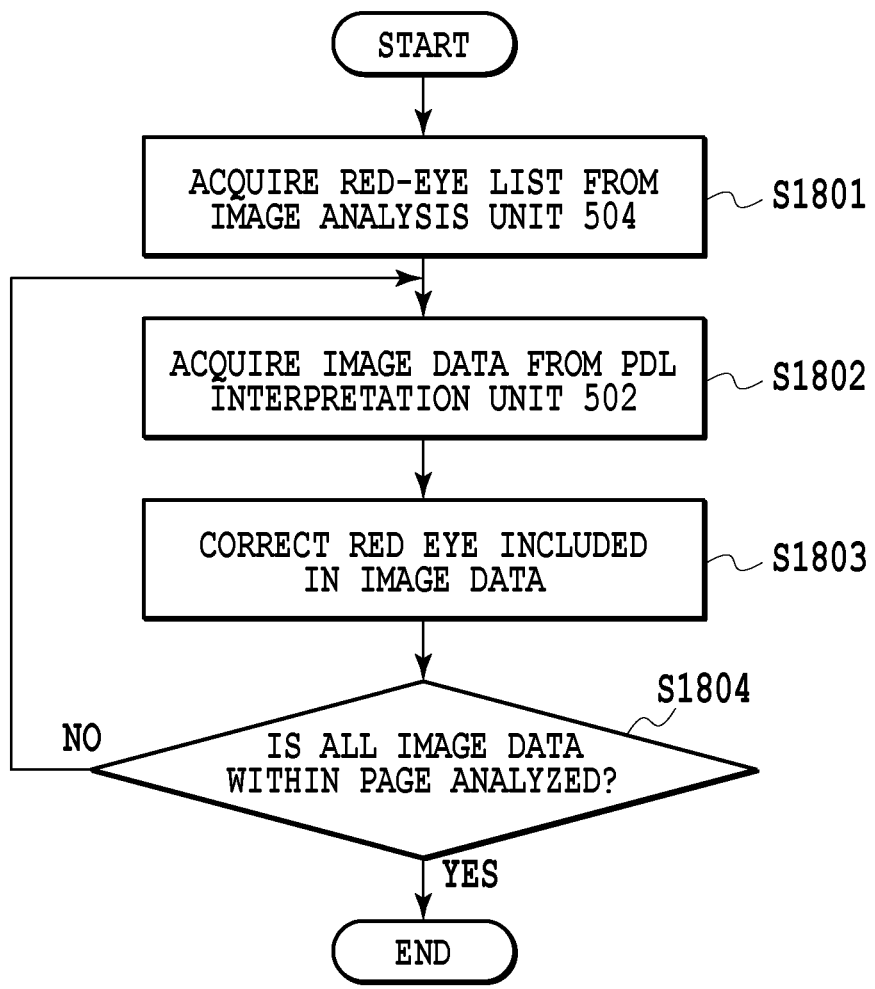
FIG. 18 is a flowchart of processing performed by an image correction unit 505 in the first embodiment.

FIG. 18 shows a flowchart of the processing performed by the image correction unit 505. First, at step S1801, the red-eye list is acquired from the image analysis unit 504. Next, at step S1802, a piece of image data is acquired from the PDL interpretation unit 502. Next, at step S1803, the red eye included in the image data is corrected. Next, at step S1804, whether all of the image data within the page is analyzed is determined by checking the image analysis unit 504. In a case when the image data not analyzed yet remains within the page, the processing returns to step S1802. In a case when the image data not analyzed yet does not remain within the page, the processing is exited. The correction method of the red eye at step S1803 is explained in detail below.

<Red Eye Correction Processing>

Figure 19:
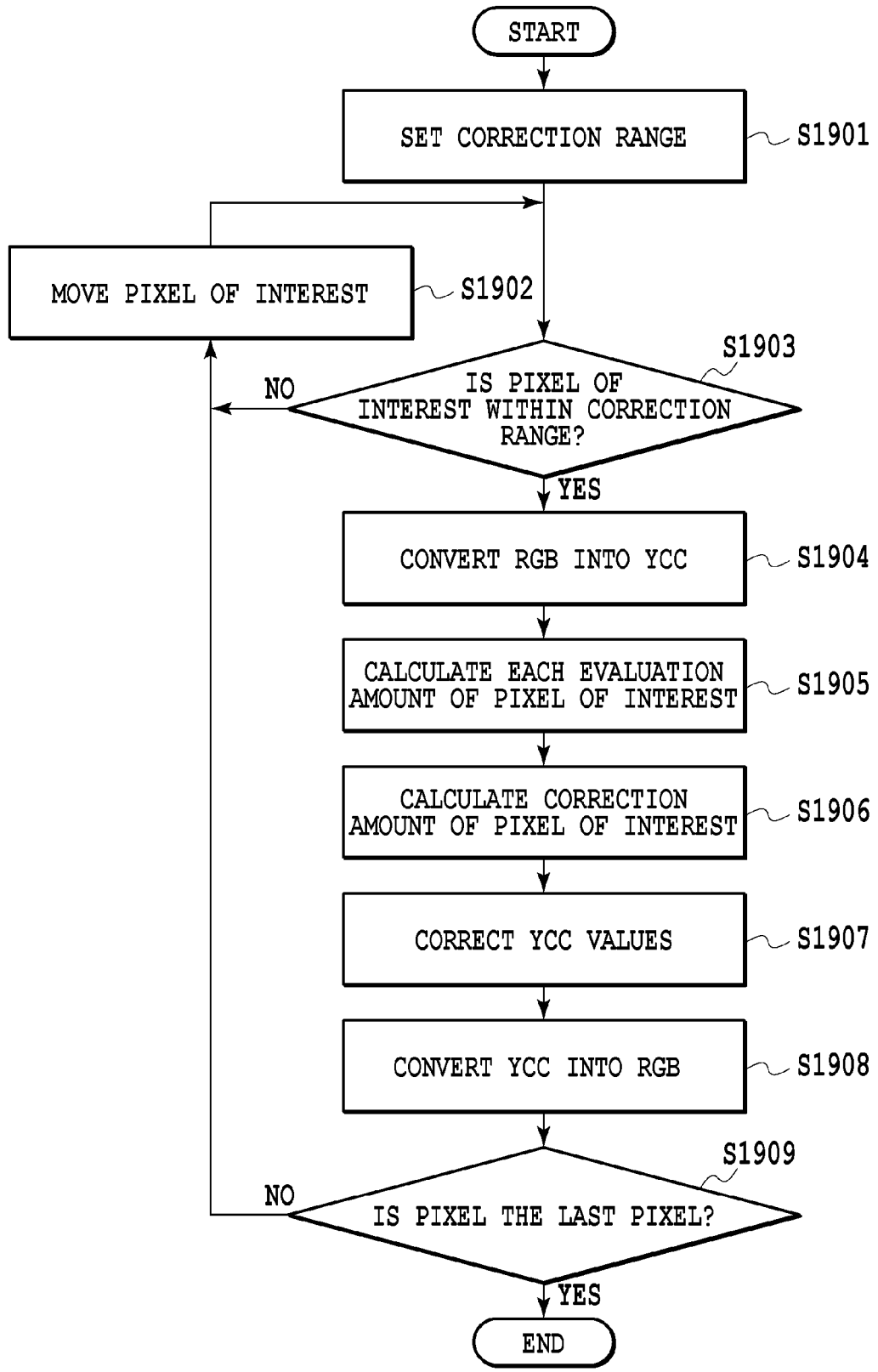
FIG. 19 is a flowchart of red-eye correction processing in the first embodiment.

FIG. 19 shows a flowchart of the red eye correction processing performed by the image correction unit 505.

Figure 20:
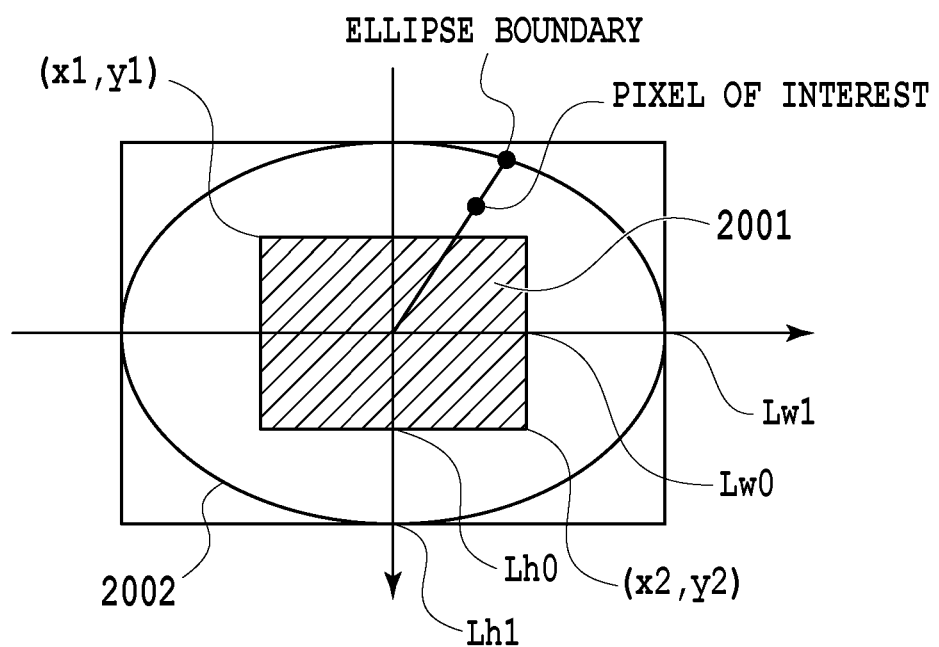
FIG. 20 is an explanatory diagram of a correction range of a red eye in the first embodiment.

First, at step S1901, the correction range is determined for the red-eye region of interest. FIG. 20 is a diagram for explaining the correction range. In FIG. 20, the rectangular region at the center is a red-eye region 2001 described in the candidate region list. A correction region 2002 of an ellipse whose major radius and minor radius passing through the center of the red-eye region 2001 are Lw1 and Lh1, respectively, is set. Lw1 and Lh1 are calculated by expression (16). Calculation expression (16) of Lw1 and Lh1:

$$Lw1=\{(x2-x1)/2\}\times\text{AREARATIO}$$

$$Lh1=\{(y2-y1)/2\}\times\text{AREARATIO}$$

Here, Lw0 is ½ of the width of the red-eye region 2001 and Lh0 is ½ of the height of the red-eye region 2001. AREARATIO is a parameter for determining the correction range. In the present embodiment, AREARATIO is assumed to be 2.

Next, at step S1903, whether or not the pixel of interest exists within the correction region 2002 is determined. It is possible to determine whether or not the pixel of interest exists within the correction region (elliptic region) 2002 by expression (17) below.

$$(x/Lw1)^2 + (y/Lh1)^2 \leq 1. \quad (17)$$

Here, (x, y) denotes coordinates of the pixel of interest. However, the origin of the coordinates is the center of the red-eye region of interest. In a case when the coordinates (x, y) of the pixel of interest satisfy the expression (17), it is determined that the pixel of interest exists within the correction region 2002 and the processing is caused to proceed to step S1904. In a case when the pixel of interest does not exist within the correction region 2002, the processing is caused to proceed to step S1902.

At step S1902, the pixel of interest is moved to the next pixel and the processing is caused to return to step S1903.

At step S1904, the RGB component values of the pixel of interest are converted into YCC values of the luminance and the color difference components. As the conversion method, there exist a variety of already-known methods, and any method may be used.

Next, at step S1905, the evaluation amounts for the pixel of interest are calculated. These evaluation amounts are parameters necessary to determine the correction amount at step S1906 in a subsequent stage and, specifically, three values as below.

(1) A ratio of a distance r from the center of the red-eye region 2001 to the pixel of interest to a distance r0 from the center of the red-eye region 2001 to the ellipse boundary: r/r0;

(2) A ratio of the evaluation amount ER of the pixel of interest to a maximum value ERmax of the evaluation amount: ER/ERmax; and (3) A ratio of luminance Y of the pixel of interest to a maximum luminance value Ymax: Y/Ymax.

Next, at step S1906, correction amounts Vy and Vc of the luminance Y and the color difference components Cr and Cb, respectively, of the pixel of interest are calculated by expression (18) below.

Calculation expression (18) of correction amounts Vy and Vc:

$$Vy = \{1-(r/r0)\} \cdot \{1-(1-(ER/ERmax))\} - \{1-(Y/Ymax)\}$$

$$Vc = \{1-(r/r0)\} \cdot \{1-(1-(ER/ERmax))\}$$

Both Vy and Vc take a value in the range between 0.0 and 1.0, and mean that the closer to 1.0, the larger the correction amount is. The correction amount Vy of luminance is determined by using all of the three parameters found at step S1905, and the correction amount becomes smaller as the position of the pixel of interest becomes more distant from the center of the correction region 2002. Further, in a case when the evaluation amount ER of the pixel of interest is small compared to the maximum value ERmax, the correction amount Vy is small. Furthermore, in a case when the luminance value Y of the pixel of interest is close to the maximum value Ymax, the correction amount Vy is small. Reducing the correction amount Vy of a pixel whose luminance is high brings about the effect of preserving the highlight part (catch light) in the eye. On the other hand, the correction amount Vc of the color difference is Vy from which the parameter related to the luminance is excluded.

Next, at step S1907, the YCC values after correction are calculated from expression (19) below by using the correction amounts Vy and Vc.

Calculation expression (19) of YCC values after correction:

$$Y' = (1.0 - Vy) \cdot Y$$

$$C' = (1.0 - Vc) \cdot C$$

Here, Y and C are values before correction and Y' and C' are values after correction.

Next, at step S1908, the YCC values after correction are converted into RGB values. To return YCC to RGB, expression (20) below is used.

Calculation expression (20) of YCC–RGB:

$$R = 1.000Y + 1.402V$$

$$G = 1.000Y - 0.344U - 0.714V$$

$$B = 1.000Y + 1.772U$$

Next, at step S1909, whether or not the pixel of interest is the last pixel is determined. In a case when the pixel of interest is the last pixel, the series of flow is exited and in a case when the pixel of interest is not the last pixel, the processing is caused to proceed to step S1902, described previously.

Until the last pixel included in the red-eye region of interest is reached, which is determined by the determination at step S1909, the pixel of interest is moved at step S1902 and the above-described processing (S1903 to S1908) is repeated. In a case when the last pixel included in the red-eye region is reached, the processing is moved to the correction processing of the next red-eye region and the correction processing of all of the red-eye regions recorded in the candidate region list is repeated. Although the method for converting the image input to the image correction unit 505, and including the RGB components into the luminance and the color difference component and correcting them, and then returning them into the RGB components again is explained, the present invention is not limited to this example. In a case when the color space of the input image is YCC or CMYK, it is also possible to correct the red eye by the same processing.

As above, according to the present embodiment, even in a case when the red eye is divided into two pieces of image data, it is possible to detect and to correct the red eye with a small memory without storing the image data itself, and without degrading performance.

Second Embodiment

In the first embodiment, the red-eye determination is performed by performing the boundary shape determination and the feature amount determination for all of the red regions after combining the red regions at the image boundary. In this case, however, the red-eye determination is performed in the final stage for the red region inside of the image, and therefore, the amount of data of the red region list becomes large, and the memory is used wastefully. Consequently, in the second embodiment, an example of a system is explained, in which wasteful use of the memory is further suppressed by reducing the number of red-eye candidates by immediately performing the boundary shape determination and the feature amount determination in a case when the red region exists inside of the image.

Figure 21:
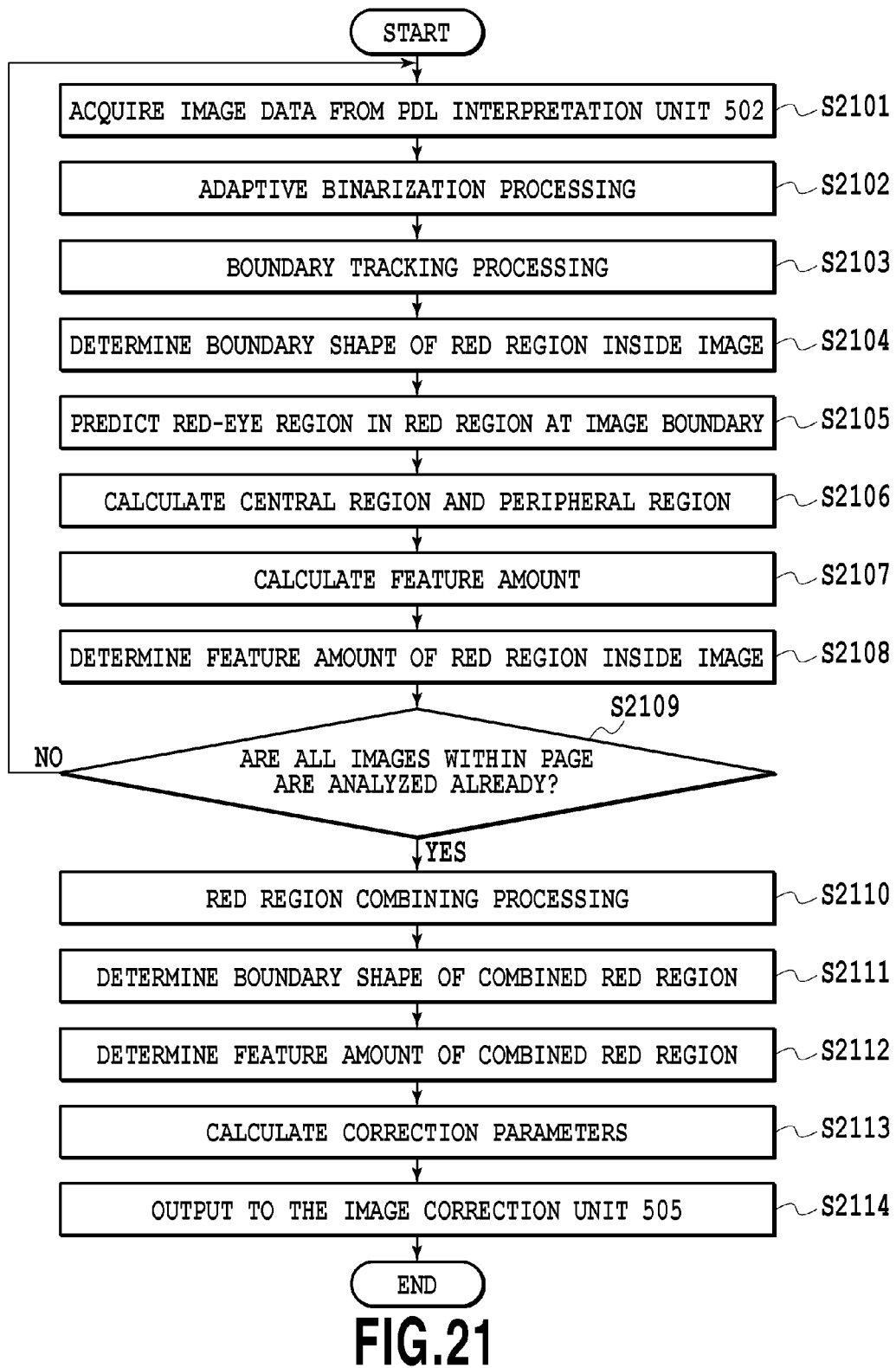
FIG. 21 is a flowchart of processing performed by the image analysis unit 504 in a second embodiment.

FIG. 21 shows a flowchart of the processing performed by the image analysis unit 504 in the second embodiment.

First, at step S2101, image data is acquired from the PDL interpretation unit 502.

Next, at step S2102, the red region is determined by the adaptive binarization processing.

Next, at step S2103, the contour information is calculated by the boundary tracking processing.

Next, at step S2104, the boundary shape determination is performed for the red region not in contact with the image end part. It is possible to determine whether the red region is in contact with the image end part by checking whether there is a value equal to or greater than one in the row of Exclusion of the direction histogram. The method of the boundary shape determination is the same as the method explained in FIG. 16 of the first embodiment.

Next, at step S2105, the red-eye region of the red region in contact with the image end part is predicted.

Next, at step S2106, the central region and the peripheral region are calculated.

Next, at step S2107, the feature amount of each red region is calculated.

Next, at step S2108, the feature amount determination is performed for the red region not in contact with the image end part. The method of the feature amount determination is the same as the method explained in FIG. 17 of the first embodiment.

Next, at step S2109, whether all of the image data within the page is received and analyzed is determined by inquiring the PDL interpretation unit 502. In a case when image data not analyzed yet still remains, the processing is caused to return to step S2101 and in a case when no unanalyzed image data remains, the processing is caused to proceed to step S2110.

At step S2110, the red region combining processing is performed, and in a case when there is a red region in contact with the end part of a certain image, which is adjacent to the red region in contact with the end part of another image, the contour information and the feature amount are combined.

Next, at step S2111, the boundary shape determination is performed for the combined red region, and the red region that is not in the shape of a circle is excluded from the red-eye candidates.

Next, at step S2112, the feature amount determination is performed for the combined red region and the red region that does not satisfy the feature amount condition of the red eye is excluded from the red-eye candidates.

Next, at step S2113, the correction parameters are calculated and stored in the candidate list.

Finally, at step S2114, the correction parameters are output to the image correction unit 505.

As above, according to the second embodiment, it is possible to reduce the amount of consumed memory and to increase the speed of performance by reducing the number of candidates by performing determination once before combining the red regions that are not in contact with the image end part.

Third Embodiment

In the first embodiment, an example of the system is explained, which detects and corrects the red eye in a case when the red eye is divided into two pieces of image data. In the third embodiment, an example of a system is explained, which detects and corrects the red eye in a case when the red eye is divided into three or more pieces of image data, or in a case when the red eye is divided into a plurality of pieces of image data, while being overlapped on one another.

Figure 22B:
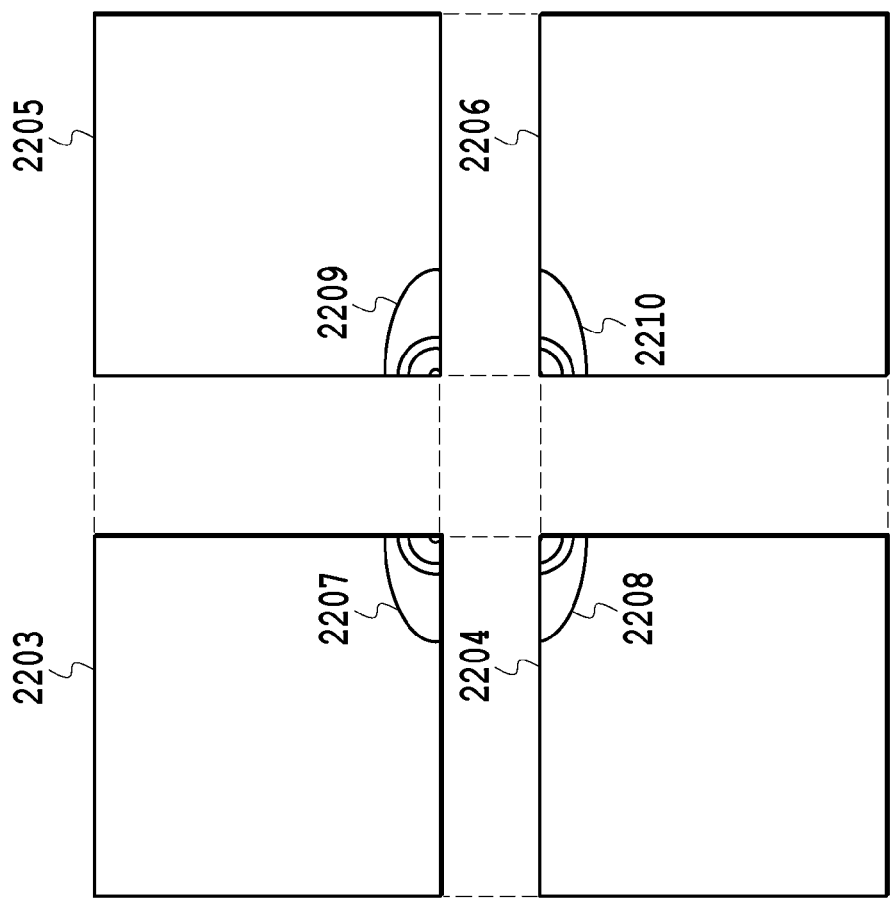
FIG. 22A and FIG. 22B are diagrams showing an example of page description language (PDL) data in a third embodiment.
Figure 22A:
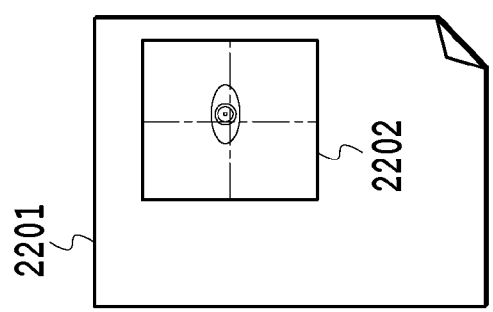

FIG. 22A and FIG. 22B show an example of PDL data in the third embodiment. FIG. 22A shows a preview of PDL data and in a page 2201, a photo 2202 having an eye in which the red eye phenomenon has occurred is allocated. FIG. 22B is an enlarged view of an image in a case when the image is drawn in accordance with the image data configuring the photo 2202. The photo 2202 includes an image 2203, an image 2204, an image 2205, and an image 2206. The image 2203 includes a red-eye defect 2207 and the red-eye defect 2207 is included in the shape about ¼ of the whole in which part thereof is missing. The image 2204 includes a red-eye defect 2208, and the red-eye defect 2208 is included in the shape about ¼ of the whole in which part thereof is missing. The image 2205 includes a red-eye defect 2209, and the red-eye defect 2209 is included in the shape about ¼ of the whole in which part thereof is missing. The image 2206 includes a red-eye defect 2210, and the red-eye defect 2210 is included in the shape about ¼ of the whole in which part thereof is missing.

Figure 23:
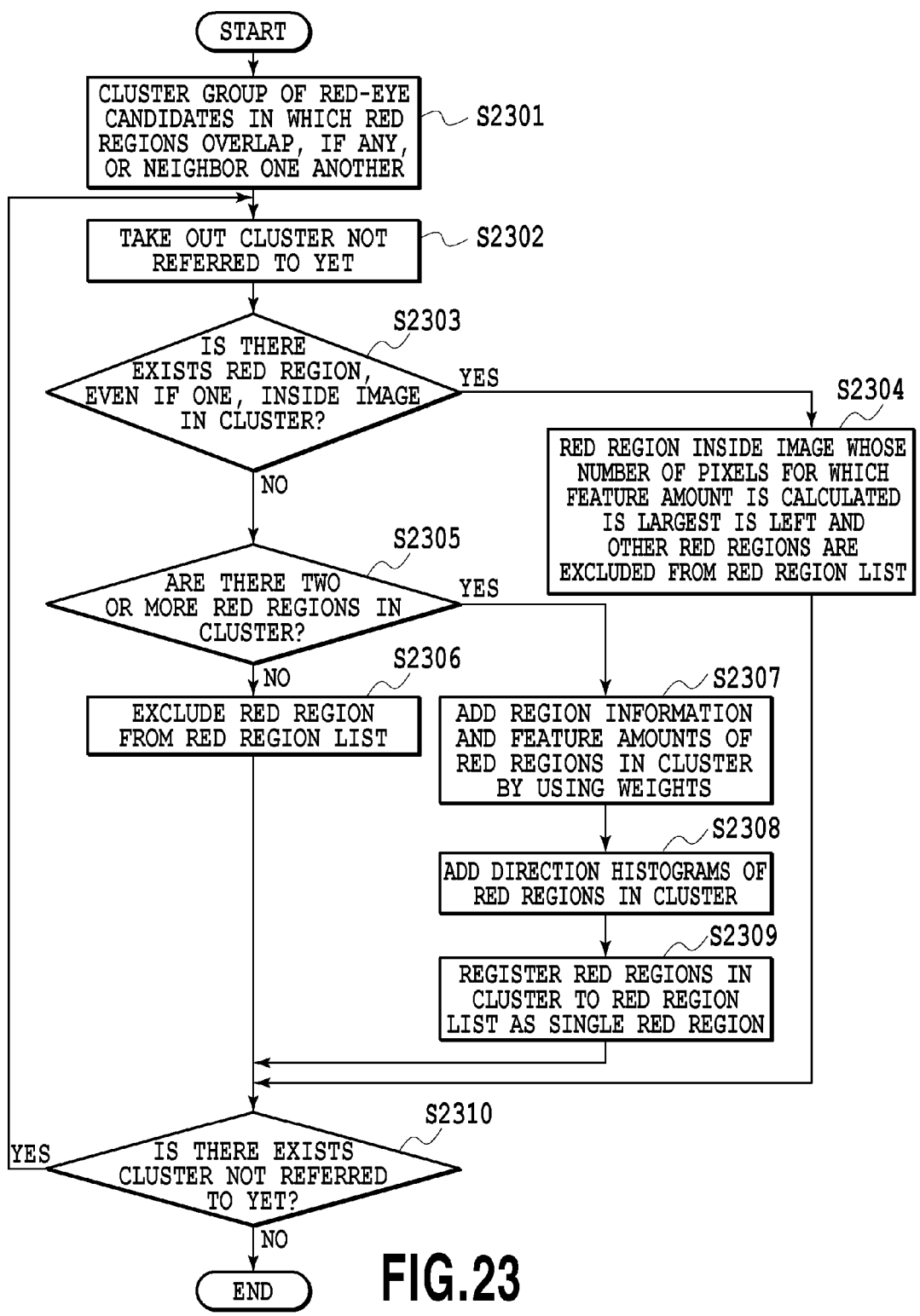
FIG. 23 is a flowchart of red region combining processing in the third embodiment.

FIG. 23 shows a flowchart of red region combining processing in the third embodiment.

First, at step S2301, a group of red-eye candidates is clustered, in which the red regions overlap, if any, or neighbor each other. In subsequent steps S2302 to S2310, combining processing is performed by sequentially referring to the cluster.

Next, at step S2302, a cluster that is not referred to yet is taken out.

Next, at step S2303, whether or not there exists a red region not in contact with the image end part in the cluster being referred to is determined. In a case when a red region not in contact with the image end part exists in the cluster being referred to, the processing proceeds to step S2304, and in a case when a red region not in contact with the image end part does not exist in the cluster being referred to, the processing proceeds to step S2305.

At step S2304, the "red region inside the image" whose number of pixels for which the feature amount has been calculated is greatest is left, and other red regions are excluded from the red region list. After step S2304, the processing proceeds to step S2301.

At step S2305, whether there are two or more red regions in the cluster is determined. In a case when there are not two or more red regions, the processing proceeds to step 2306, and in a case when there are two or more red regions, the processing proceeds to step S2307.

At step S2306, the red region within the cluster is excluded from the red region list.

At step S2307, the region information and the feature amounts in the cluster are added by using weights. This addition processing is the same as the addition processing of the region information and the feature amounts at step S1506 explained in the first embodiment.

Next, at step S2308, the direction histograms of the red regions in the cluster are added. In a case when the image data is divided while the red eyes overlap, the addition of the direction histograms is not easy to perform. The reason is that there may be a case when the same direction edge is added repeatedly. Because of this, it is necessary to perform addition by predicting the edge calculated repeatedly. This method will be described later.

Next, at step S2309, the red regions in the cluster are registered in the red region list as a single red region. After step S2309, the processing proceeds to step S2310.

At step S2310, whether or not there exists a cluster not referred to yet is determined. In a case when there exists a cluster not referred to yet, the processing returns to step S2302. In a case when a cluster not referred to yet does not exist, the processing is exited.

<Addition Method of Direction Histograms>

Figure 24:
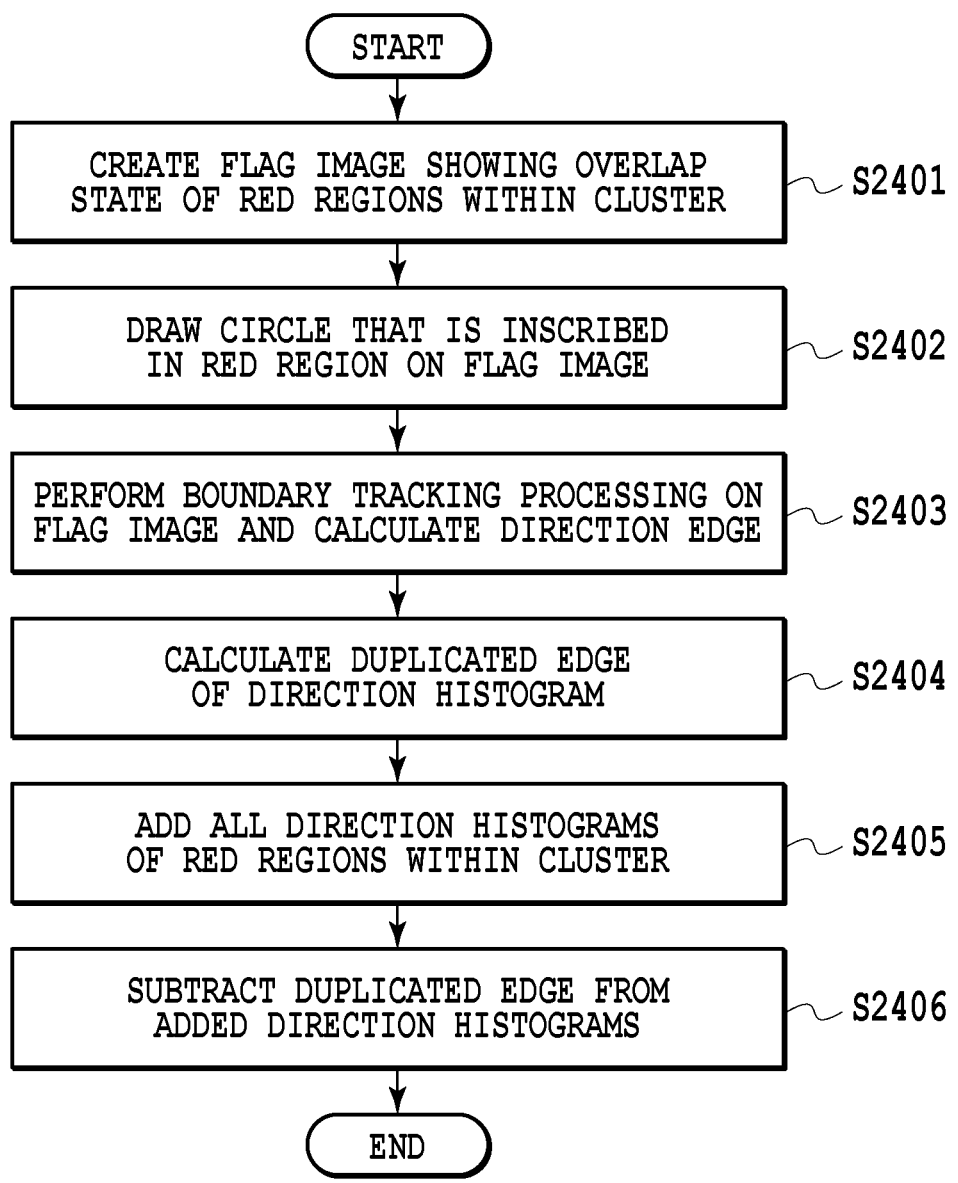
FIG. 24 is a flowchart of direction histogram addition processing in the third embodiment.

FIG. 24 shows a flowchart of the direction histogram addition processing at step S2308. FIG. 25A shows an example of how the red regions overlap within the cluster taken out at step S2302. In the example in FIG. 25A, the image data is divided into four pieces of image data with red eyes partially overlapped, and therefore, four red regions overlap.

First at step S2401, a flag image showing the overlapped state of the red regions within the cluster is created. FIG. 25B shows an example of the flag image in the cluster. The size of the flag image is the same as the size of the four red regions after being combined. To each pixel, the degree of overlap is set, and the number of red regions that overlap is set as the degree of overlap, such as in a case when two red regions overlap, 2 is set, in a case when three red regions overlap, three is set, in a case when four red regions overlap, four is set, and so on.

Next, at step S2402, a circle that is inscribed in the red region, which is the four regions combined together, is drawn on the flag image. FIG. 25C shows an example in which an inscribed circle is drawn on the flag image.

Next, at step S2403, on the flag image on which the inscribed circle is drawn, the boundary tracking processing is performed, and the direction edges are calculated. The method of calculating direction edges is the same as the method explained in the first embodiment by using FIG. 10. FIG. 25D shows an example in which the direction edges are calculated on the flag image.

Next, at step S2404, duplicated edges of the direction histograms are calculated.

Next, at step S2405, all of the direction histograms of the red regions within the cluster are added.

Finally, at step S2406, the duplicated edges calculated at S2404 are subtracted from the direction histograms. By the above, the addition of the direction histograms that has taken into consideration the duplication of the direction edges due to overlap is enabled.

As above, according to the third embodiment, in a case when the red eye is divided into three or more pieces of image data or in a case when the red eye is divided into a plurality of pieces of image data, while being overlapped on one another, it is also possible to detect and to correct the red eye.

In the above-described first, second, and third embodiments, the examples related to the red-eye detection are explained, but the object to be detected may be a face, a nose, a mouth, an eye, a specific mark, or a specific shape having a specific color, not limited to the red eye.

Other Embodiments

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or an apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
an acquisition unit configured to acquire a plurality of divided images from one image, wherein neighboring divided images of the plurality of divided images do not have an overlapping region;
an extraction unit configured to extract a candidate region of a specific region in each of the neighboring divided images;
a combining unit configured, in a case when candidate regions extracted by the extraction unit neighbor one another at the boundary between the neighboring divided images, to combine shape information of the candidate regions that neighbor one another; and
a determination unit configured to determine whether or not the candidate regions form the specific region by using the shape information combined by the combining unit.

2. The image processing apparatus according to claim 1, wherein the specific region is a red-eye region.

3. The image processing apparatus according to claim 1, wherein the shape information is a direction histogram obtained by adding values in edge directions of the candidate regions.

4. The image processing apparatus according to claim 3, wherein, in a case when there is no imbalance in a specific direction in the direction histogram, the determination unit determines that the candidate regions form the specific region.

5. The image processing apparatus according to claim 1, wherein the determination unit further performs a determination by using a feature amount of a combined region, which is a combination of the candidate regions.

6. The image processing apparatus according to claim 5, wherein the feature amount is luminance of the combined region.

7. An image processing method comprising:
an acquisition step of acquiring a plurality of divided images from one image, wherein neighboring divided images of the plurality of divided images do not have an overlapping region;
an extraction step of extracting a candidate region of a specific region in each of the neighboring divided images;
a combining step of, in a case when candidate regions extracted in the extraction step neighbor one another at the boundary between the neighboring divided images, combining shape information of the candidate regions that neighbor one another; and
a determination step of determining whether or not the candidate regions form the specific region by using the shape information combined in the combining step.

8. A non-transitory computer readable storage medium storing a program for causing a computer to function as an image processing apparatus comprising:
an acquisition unit configured to acquire a plurality of divided images from one image, wherein neighboring divided images of the plurality of divided images do not have an overlapping region;

an extraction unit configured to extract a candidate region of a specific region in each of the neighboring divided images;
a combining unit configured, in a case when candidate regions extracted by the extraction unit neighbor one another at the boundary between the neighboring divided images, to combine shape information of the candidate regions that neighbor one another; and
a determination unit configured to determine whether or not the candidate regions form the specific region by using the shape information combined by the combining unit.

* * * * *